United States Patent
Schoeny et al.

(10) Patent No.: US 10,408,667 B2
(45) Date of Patent: Sep. 10, 2019

(54) CALIBRATION METHODS FOR MULTI-VARIETY SEED METERS AND RELATED SYSTEMS

(71) Applicant: CNH Industrial America, LLC, New Holland, PA (US)

(72) Inventors: Christopher Schoeny, Yorkville, IL (US); Chad M. Johnson, Arlington Heights, IL (US)

(73) Assignee: CNH Industrial America LLC, New Holland, PA (US)

(*) Notice: Subject to any disclaimer, the term of this patent is extended or adjusted under 35 U.S.C. 154(b) by 69 days.

(21) Appl. No.: 15/852,043

(22) Filed: Dec. 22, 2017

(65) Prior Publication Data
US 2019/0195677 A1 Jun. 27, 2019

(51) Int. Cl.
| G01F 25/00 | (2006.01) |
|---|---|
| G01F 1/34 | (2006.01) |
| A01C 7/04 | (2006.01) |
| G01F 23/292 | (2006.01) |
| G01F 1/00 | (2006.01) |

(52) U.S. Cl.
CPC .......... *G01F 25/0092* (2013.01); *A01C 7/046* (2013.01); *G01F 1/007* (2013.01); *G01F 1/34* (2013.01); *G01F 23/292* (2013.01)

(58) Field of Classification Search
CPC ........ G01F 25/0092; G01F 25/00; G01F 1/34; G01F 1/007; A01C 7/046; A01C 7/04; A01C 7/06
USPC ....... 73/1.36, 865.8, 865.9; 702/33, 85, 104, 702/105; 111/189, 199, 905
See application file for complete search history.

(56) References Cited

U.S. PATENT DOCUMENTS

| 5,253,534 A | 10/1993 | Hamilton, Jr. |
|---|---|---|
| 5,915,313 A | 6/1999 | Bender et al. |
| 5,963,139 A | 10/1999 | Littke |
| 6,527,205 B2 | 3/2003 | Anderson et al. |
| 6,845,724 B2 | 1/2005 | Mayerle et al. |

(Continued)

FOREIGN PATENT DOCUMENTS

CA 2311698 12/2001

OTHER PUBLICATIONS

John Deere/US "Spacing and Singulation" www.deere.com Dated Feb. 9, 2017 (3 pages).

(Continued)

*Primary Examiner* — Robert R Raevis
(74) *Attorney, Agent, or Firm* — Rebecca L. Henkel; Rickard K. DeMille

(57) ABSTRACT

In one aspect, a calibration method for a multi-variety seed meter may include terminating a supply of seeds to a seed meter and subsequently operating the seed meter to discharge seeds therefrom. Additionally, upon terminating the supply of seeds to the seed meter, the method may include monitoring a parameter indicative of an amount of seeds remaining within the seed pool based on data received from a first sensor. The method may also include monitoring an operation of the seed meter based on data received from a second sensor to identify the occurrence of a starvation event for the seed meter and determining a target value for the monitored parameter based at least in part on a starvation interval defined between the termination of the supply of seeds to the seed meter and the occurrence of the starvation event.

20 Claims, 16 Drawing Sheets

(56) References Cited

U.S. PATENT DOCUMENTS

| | | |
|---|---|---|
| 7,478,603 B2 | 1/2009 | Riewerts et al. |
| 7,725,251 B2 | 5/2010 | Steimel |
| 8,408,478 B2 | 4/2013 | Wonderlich |
| 8,543,238 B2 | 9/2013 | Straeter |
| 8,695,396 B2 | 4/2014 | Landphair et al. |
| 8,925,471 B2 | 1/2015 | Adams et al. |
| 8,942,894 B2 | 1/2015 | Garner et al. |
| 8,942,896 B2 | 1/2015 | Mayerle |
| 8,948,980 B2 | 2/2015 | Garner et al. |
| 9,043,949 B2 | 6/2015 | Liu |
| 9,179,594 B2 | 11/2015 | Graham |
| 9,426,940 B2 | 8/2016 | Connors et al. |
| 9,481,294 B2 | 11/2016 | Sauder et al. |
| 9,941,901 B2 | 4/2018 | Chen et al. |
| 2012/0226461 A1 | 9/2012 | Kowalchuk |
| 2014/0165891 A1* | 6/2014 | Garner .............. A01C 7/08 111/170 |
| 2014/0277959 A1 | 9/2014 | Wagers et al. |
| 2015/0156964 A1 | 6/2015 | Krohn et al. |
| 2015/0195988 A1 | 7/2015 | Radtke et al. |
| 2015/0216107 A1 | 8/2015 | Wendte et al. |
| 2015/0223391 A1 | 8/2015 | Wendte et al. |
| 2016/0050842 A1 | 2/2016 | Sauder et al. |
| 2016/0249525 A1 | 9/2016 | Baurer et al. |
| 2016/0255766 A1 | 9/2016 | Assy et al. |

OTHER PUBLICATIONS

CASE IH "Precision Disk™ 500T Air Drill" www.caseih.com Dated Feb. 9, 2017 (23 pages).

John Deere "Planter Meter Test Stand" Jdparts.deer.com Dated 2015 (40 Pages).

* cited by examiner

CALIBRATION METHODS FOR MULTI-VARIETY SEED METERS AND RELATED SYSTEMS

FIELD OF THE INVENTION

The present subject matter relates generally to multi-variety seed meters and, more particularly, to a method for calibrating one or more sensors of a multi-variety seed meter to allow for increased accuracy and reliability when switching between seed types during the subsequent performance of a multi-variety seed planting operation.

BACKGROUND OF THE INVENTION

Modern farming practices strive to increase yields of agricultural fields. Technological advances in the area of planting implements or planters allow for better agronomic characteristics at the time of planting, such as providing more accurate seed depth, improved uniformity of seed depth across the planter, and improved accuracy of in-row seed spacing. However, a single field can have performance inconsistencies between different areas of the field. That is because a field can have a wide variety of soil types and management zones, such as irrigated and non-irrigated zones in different areas. To address this issue, seed companies have developed multiple varieties of each of their seed product types, with the different varieties offering improved performance characteristics for different types of soil and management practices.

In this regard, efforts have been made to plant multiple varieties of a particular seed product type in different areas of fields with different soil types or management zones. For example, planters have been developed that include separate bulk fill hoppers for different seed varieties and that require the reservoir for each seed meter be completely cleaned out or planted out before a different seed variety can be delivered to the seed meters. However, it is often quite difficult to determine when a given seed meter has been completely emptied of seeds to allow a new seed type to be delivered to the meter. As a result, current planting systems are typically ill-equipped to effectively and efficiently automatically switch between seed types during the performance of a planting operation.

Accordingly, a system and method for calibrating the sensors of a multi-variety seed meter to allow for increased accuracy and reliability when switching between seed varieties or types during a subsequent planting operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a calibration method for a multi-variety seed meter. The method may include terminating a supply of seeds to a seed meter and subsequently operating the seed meter to discharge seeds therefrom during a first calibration cycle. Additionally, upon terminating the supply of seeds to the seed meter, the method may include monitoring, by one or more computing devices, a parameter indicative of an amount of seeds remaining within a seed pool of the seed meter based on data received from a first sensor as the seeds are being discharged from the seed meter during the first calibration cycle, wherein the first sensor is configured to directly detect the presence, absence or fill-level of seeds at one or more locations within the seed meter. The method may also include monitoring, by the one or more computing devices, an operation of the seed meter based on data received from a second sensor to identify the occurrence of a starvation event for the seed meter as the seeds are being discharged from the seed meter during the first calibration cycle and determining, by the one or more computing devices, a target value for the first sensor based at least in part on a starvation interval for the seed meter defined between the termination of the supply of seeds to the seed meter and the occurrence of the starvation event.

In another aspect, the present subject matter is directed to a calibration method for a multi-variety seed meter. The method may include terminating a supply of seeds to a seed meter and subsequently operating the seed meter to discharge seeds therefrom during a first calibration cycle. Additionally, upon terminating the supply of seeds to the seed meter, the method may include monitoring, by one or more computing devices, a parameter indicative of an amount of the seeds remaining within a seed pool of the seed meter based on data received from a first sensor as seeds are being discharged from the seed meter during the first calibration cycle. The method may also include monitoring, by the one or more computing devices, an operation of the seed meter based on data received from a second sensor to identify the occurrence of a starvation event for the seed meter as the seeds are being discharged from the seed meter during the first calibration cycle and continuing to monitor, by the one or more computing devices, the operation of the seed meter based on the data received from the second sensor to identify the occurrence of a meter empty event for the seed meter as the seeds are being further discharged from the seed meter during the first calibration cycle, with the meter empty event occurring after the occurrence of the starvation event. Moreover, the method may include determining, by the one or more computing devices, a starvation buffer value for the seed meter based at least in part on an intermediate operating interval defined between the occurrence of the starvation event and the occurrence of the meter empty event and/or a sensing delay interval associated with the first and second sensors. Further, the method may also include determining, by the one or more computing devices, a target value for the first sensor based at least in part on the starvation buffer value.

In a further aspect, the present subject matter is directed to a calibration method for a multi-variety seed meter. The method may include terminating a supply of seeds to a seed meter and subsequently operating the seed meter to discharge seeds therefrom. Additionally, upon terminating the supply of seeds to the seed meter, the method may include monitoring, by one or more computing devices, a parameter indicative of an amount of the seeds remaining within a seed pool of the seed meter based on data received from a first sensor as the seeds are being discharged from the seed meter. The method may also include monitoring, by the one or more computing devices, an operating interval for the seed meter following the termination of the supply of seeds relative to an anticipated starvation interval for the seed meter. Moreover, when the operating interval is greater than or equal to the anticipated starvation interval prior to the detection of a starvation event for the seed meter, the method may include evaluating, by the one or more computing devices, the monitored parameter relative to a predetermined target value for the parameter. Further, the method may include adjusting, by the one or more computing devices, the anticipated starvation interval when a variance between the monitored parameter and the predetermined target value falls outside a predetermined tolerance range defined relative to the predetermined target value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
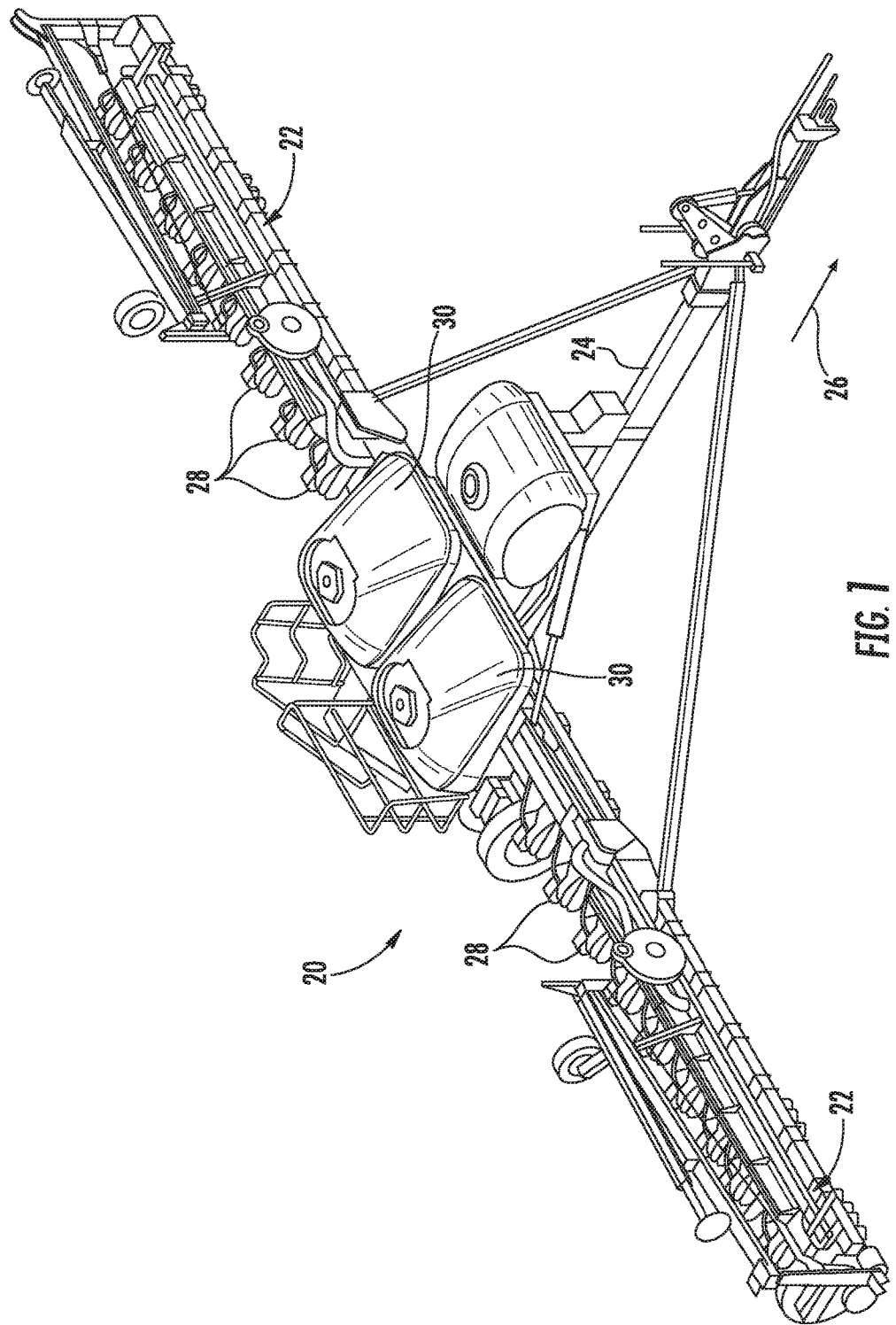
FIG. 1 illustrates a perspective view of one embodiment of a planter in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to one or more calibration methods and related systems for calibrating a multi-variety seed meter. Specifically, in several embodiments, the present subject matter discloses various calibration routines that can be performed to calibrate the sensor data received from one or more sensors configured to monitor one or more operating parameters of a seed meter. For instance, in one embodiment, the disclosed calibration routine(s) may be used to calibrate sensor data received from a fill status sensor configured to monitor an operating parameter for the seed meter that is indicative of the amount of seeds remaining within the seed pool of the seed meter (e.g., a "starvation parameter" of the seed meter). As such, by calibrating the sensor data, the feedback received from such sensor may be used to accurately and reliably determine when the seed meter is about to be starved of seeds, which may, in turn, be used to identify when to supply either additional seeds of the current variety or seeds of a new seed variety to the seed meter during execution of a multi-variety planting operation.

Referring now to drawings, FIG. 1 illustrates a perspective view of one embodiment of a planting implement or planter 20 in accordance with aspects of the present subject matter. As shown in FIG. 1, the planter 20 may include a laterally extending toolbar or frame assembly 22 connected at its middle to a forwardly extending tow bar 24 to allow the planter 20 to be towed by a work vehicle (not shown), such as an agricultural tractor, in a direction of travel (e.g., as indicated by arrow 26). The frame assembly 22 may generally be configured to support a plurality of seed planting units (or row units) 28. As is generally understood, each row unit 28 may be configured to deposit seeds at a desired depth beneath the soil surface and at a desired seed spacing as the planter 20 is being towed by the work vehicle, thereby establishing rows of planted seeds. In some embodiments, the bulk of the seeds to be planted may be stored in one or more seed tanks 30. Thus, as seeds are planted by the row units 28, a pneumatic distribution system may distribute additional seeds from the seed tanks 30 to the individual row units 28. Additionally, as will be described below, each row unit 28 may also include one or more individual seed hoppers for locally storing seeds at the row unit 28.

It should be appreciated that, for purposes of illustration, only a portion of the row units 28 of the planter 20 have been shown in FIG. 1. In general, the planter 20 may include any number of row units 28, such as 6, 8, 12, 16, 24, 32, or 36 row units. In addition, it should be appreciated that the lateral spacing between row units 28 may be selected based on the type of crop being planted. For example, the row units 28 may be spaced approximately 30 inches from one another for planting corn, and approximately 15 inches from one another for planting soybeans.

It should also be appreciated that the configuration of the planter 20 described above and shown in FIG. 1 is provided only to place the present subject matter in an exemplary field of use. Thus, it should be appreciated that the present subject matter may be readily adaptable to any manner of planter configuration.

Figure 2:
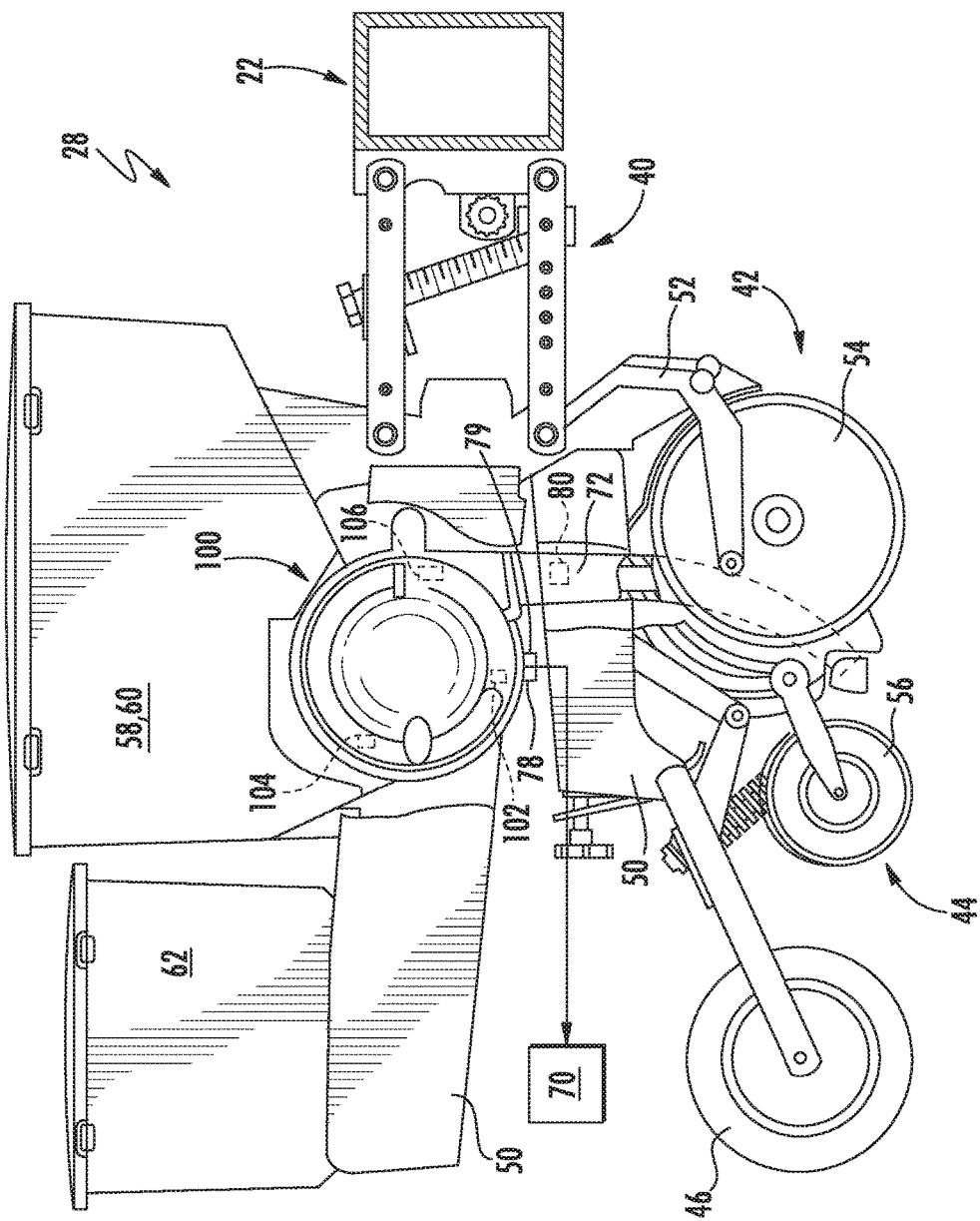
FIG. 2 illustrates a side view of one embodiment of a row unit suitable for use with a planter in accordance with aspects of the present subject matter.

Referring now to FIG. 2, a side view of one embodiment of a row unit 28 is illustrated in accordance with aspects of the present subject matter. As shown, the row unit 28 includes a linkage assembly 40 configured to mount the row unit 28 to the toolbar or frame assembly 22 of the planter 20. As shown in FIG. 2, the row unit 28 also includes a furrow opening assembly 42, a furrow closing assembly 44, and a press wheel 46. In general, the furrow opening assembly 42 may include a gauge wheel (not shown) operatively connected to a frame 50 of the row unit 28 via a support arm 52. Additionally, the opening assembly 42 may also include one or more opening disks 54 configured to excavate a furrow, or trench, in the soil. As is generally understood, the gauge wheel may be configured to engage the surface of the field, with the height of the opening disk(s) 54 being adjusted with respect to the position of the gauge wheel to set the desired depth of the furrow being excavated. Moreover, as shown, the furrow closing assembly 44 may include a closing disk(s) 56 configured to close the furrow after seeds have been deposited into the furrow. The press wheel 46 may then be configured to roll over the closed furrow to firm the soil over the seed and promote favorable seed-to-soil contact.

Additionally, as shown in FIG. 2, the row unit 28 may include one or more seed hoppers 58, 60 and, optionally, a granular chemical product hopper 62 supported on the frame 50. In general, the seed hopper(s) 58, 60 may be configured to store seeds to be gravitationally deposited within the furrow as the row unit 28 moves over and across the field. For instance, in one embodiment, the row unit 28 may include a first seed hopper 58 configured to store seeds 64 (FIG. 3) of a first seed type and a second hopper 60 configured to store seeds 66 (FIG. 3) of a second seed type. In another embodiment, the row unit 28 may include more than two seed hoppers, with each seed hopper storing a different seed type. Alternatively, a single seed hopper may be used to store more than one type of seed. For example, a single seed hopper may be internally divided (e.g., via a divider wall(s)) so as to define separate seed chambers or compartments for storing differing seed types.

Moreover, the row unit 28 may include a seed meter 100 provided in operative association with the seed hopper(s) 58, 60. In general, the seed meter 100 may be configured to uniformly release seeds received from the seed hopper(s) 58, 60 for deposit within the furrow. For instance, the seed meter 100 may be coupled to a suitable vacuum source 70 (e.g., a blower powered by a motor and associated tubing or hoses) configured to generate a vacuum or negative pressure that attaches the seeds to a rotating seed transport member (e.g., a seed disk) of the seed meter 100, which controls the rate at which the seeds are output from the seed meter 100 to an associated seed tube 72 (or other seed delivery mechanism).

As shown in FIG. 2, the seed tube 72 may extend vertically between the seed meter 100 and the ground to facilitate delivery of the seeds output from the seed meter 100 to the furrow.

Additionally, one or more sensors may be provided in operative association with the seed meter 100 for monitoring one or more operating parameters of the seed meter 100. For instance, as will be described in greater detail below, the seed meter 100 may include one or more seed pool sensors 102, pre-singulation sensors 104, and/or post-singulation sensors 106 for monitoring one or more parameters that provide an indication of the amount of seeds remaining within a seed pool of the seed meter 100. The seed meter 100 may also include or be provided in operative association with one or more additional sensors, such as a vacuum sensor 78 for monitoring the vacuum or negative pressure being applied within the seed meter 100, an airflow sensor 79 for monitoring an airflow level applied to the seed transport member, and/or a rotary encoder (not shown in FIG. 2) for monitoring the rotation of the seed transport member within the seed meter 100. Moreover, a seed delivery sensor 80 may be provided in operative association with the seed tube 72 (or other seed delivery mechanism) for monitoring the seeds falling or being transported through the seed tube 72 (or other seed delivery mechanism) after being discharged from the seed meter 100.

It should be appreciated that the configuration of the row unit 28 described above and shown in FIG. 2 is provided only to place the present subject matter in an exemplary field of use. Thus, it should be appreciated that the present subject matter may be readily adaptable to any manner of row unit configuration.

Figure 3:
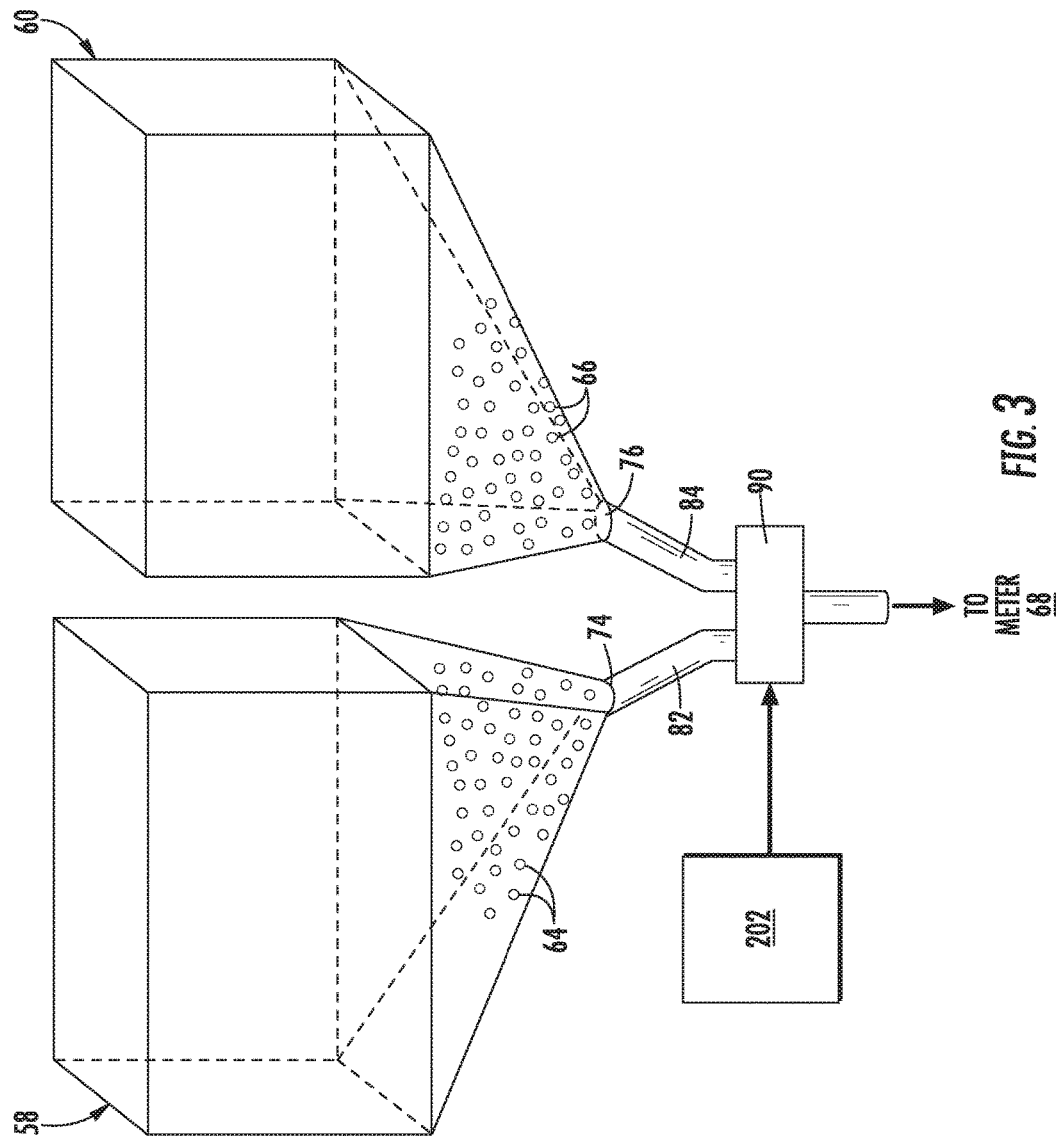
FIG. 3 illustrates a seed supply arrangement for supplying seeds of differing types to a seed meter in accordance with aspects of the present subject matter.

Referring now to FIG. 3, a schematic view of one embodiment of seed supply arrangement for supplying different types of seeds to the seed meter 100 of a row unit 28 is illustrated in accordance with aspects of the present subject matter. As shown, the first and second seed hoppers 58, 60 of the row unit 28 may each include a respective seed discharge outlet 74, 76, with each seed discharge outlet 74, 76 feeding into a respective input conduit 82, 84 in flow communication with a seed supply device 90. In general, the seed supply device 90 may correspond to any suitable device or mechanism (including any combination of devices or mechanisms) configured to regulate the supply of seeds 64, 66 from the first and second seed hoppers 58, 60 to the seed meter 100. For instance, as indicated above, seeds 64 of a first seed type may be stored within the first seed hopper 58 while seeds 66 of a second seed type may be stored within the second seed hopper 60. In such an embodiment, the seed supply device 90 may be configured to control the flow of seeds 64, 66 to the seed meter 100 based on the desired or selected seed type to be planted. For instance, when it is desired to supply seeds 64 of the first seed type to the seed meter 100, the seed supply device 90 may block the flow of seeds 66 through the input conduit 84 associated with the second seed hopper 60 while allowing seeds 64 from the first seed hopper 58 to flow through its associated input conduit 82 and be supplied to the seed meter 100. Similarly, when it is desired to supply seeds 66 of the second seed type to the seed meter 100, the seed supply device 90 may block the flow of seeds 64 through the input conduit 82 associated with the first seed hopper 58 while allowing seeds 66 from the second seed hopper 60 to flow through its associated input conduit 84 and be supplied to the seed meter 100.

It should be appreciated that, in one embodiment, the seed supply device 90 may correspond to one or more control valves configured to regulate the supply of seeds 64, 66 to the seed meter 100. For example, in one embodiment, a single control valve may be used that is configured to be selectively actuated between a first position in which seeds 64 of the first seed type are supplied from the first seed hopper 58 to the seed meter 100, a second position in which seeds 66 of the second type are supplied from the second seed hopper 60 to the seed meter 100, and a third position in which the control valve(s) stops the supply or flow of seeds 64, 66 from both of the seed hoppers 58, 60 to the seed meter 100. Alternatively, the seed supply device 90 may include two separate control valves (e.g., a first control valve provided in operative association with the input conduit 82 for the first seed hopper 58 and a second control valve provided in operative association with the input conduit 84 for the second seed hopper 60), with each valve configured to be actuated between opened and closed states for controlling the flow of seeds 64, 66 from its respective seed hopper 58, 60 to the seed meter 100.

Additionally, in particular embodiment, the seed supply device 90 may include actively controlled gates configured to be actuated between opened and closed positions to control the flow of seeds 64, 66 to the seed meter 100. For example, a first seed gate may be provided in operative association with the input conduit 82 for the first seed hopper 58 for controlling the flow of seeds 64 of the first seed type to the seed meter 100. Similarly, a second seed gate may be provided in operative association with the input conduit 84 for the second seed hopper 60 for controlling the flow of seeds 66 of the second seed type to the seed meter 100.

Moreover, in another embodiment, the seed supply arrangement may form part of or otherwise be configured as a pre-metered seed supply system. In such an embodiment, the seed supply device 90 may correspond to or may be provided in operative association with a pre-metering device. For example, the seed supply device 90 may include or be associated with one or more fluted feed rolls configured to be rotationally driven by an associated motor, with the fluted feed roll(s) being configured to supply a metered amount of seeds to the seed meter 100 with each partial rotation of the feed roll(s). As such, by actively controlling the rotation of the fluted feed roll(s) (e.g., via controlling the operation of the associated motor), the supply of seeds to the seed meter 100 can be accurately regulated.

Regardless of the specific configuration of the seed supply device 90, such device 90 may be configured to be actively controlled to allow instantaneous control of the flow of seeds 64, 66 to the seed meter 100. For instance, as schematically shown in FIG. 3 and as will be described below, the operation of the seed supply device 90 may be controlled via an electronic controller 202 communicatively coupled to the device 90. In such an embodiment, the controller 202 may be configured to transmit suitable control signals to the seed supply device 90 for controlling its operation, thereby allowing the controller 202 to actively control the supply of seeds 64, 66 to the seed meter 100. For instance, the controller 202 may control the operation of the seed supply device 90 to cut off the supply of seeds 64, 66 from one of the seed hoppers 58, 60 while allowing seeds 64, 66 from the other seed hopper 58, 60 to be conveyed to the seed meter 100. Similarly, the controller 202 may control the operation of the seed supply device 90 such that the supply of seeds 64, 66 from both seed hoppers 58, 60 is either cut-off or turned on.

It should be appreciated that, although the seeds 64, 66 contained within the seed hoppers 58, 60 will generally be described herein as corresponding to different seed "types," it should be appreciated that the description of the different types includes different varieties or hybrids. In other words, the different types of seeds may include not only different varieties of the same plant species, but also different seed products. In this regard, different seed products can include seeds of different species as well as coated and uncoated seeds, such as insecticide coated and non-insecticide coated seeds. The different seed products can also include refuge in a bag seed and non-refuge in a bag seed, plant-parasite resistant seed and non-plant-parasite resistant seed, such as cyst nematode resistant seeds and non-cyst nematode resistant seeds, seed tolerant to herbicide and seed not tolerant to herbicide, or other different products.

It should also be appreciated that the configuration of the seed supply arrangement described above and shown in FIG. 3 is provided only to place the present subject matter in an exemplary field of use. Thus, it should be appreciated that the present subject matter may be readily adaptable to any manner of seed supply arrangement for supplying seeds of differing types to the seed meter 100 of each row unit 28. For instance, as indicated above, in another embodiment, a single seed hopper may be provided at each row unit 28, with the seed hopper being divided into separate compartments or chambers for storing seeds of differing types. In such an embodiment, the seed supply device 90 may be configured to regulate the supply of seeds from each compartment or chamber of the single seed hopper to control which type of seed is delivered to the seed meter 100. Alternatively, in embodiments in which each row unit 28 is not configured to store different seed types locally via separate hoppers or a multi-chamber hopper, the seed supply device 90 may be configured to regulate the supply of seeds from the seed tanks 30 of the planter 20 to control which type of seed is delivered to the seed meter 100. For instance, when seeds of differing types are configured to be supplied from the seed tanks 30 via a pneumatic distribution system, the seed supply device 90 may be provided in operative association with the pneumatic distribution system to control which type of seed is being delivered to the seed meters 100 of the row units 28, either individually or collectively.

Figure 4:
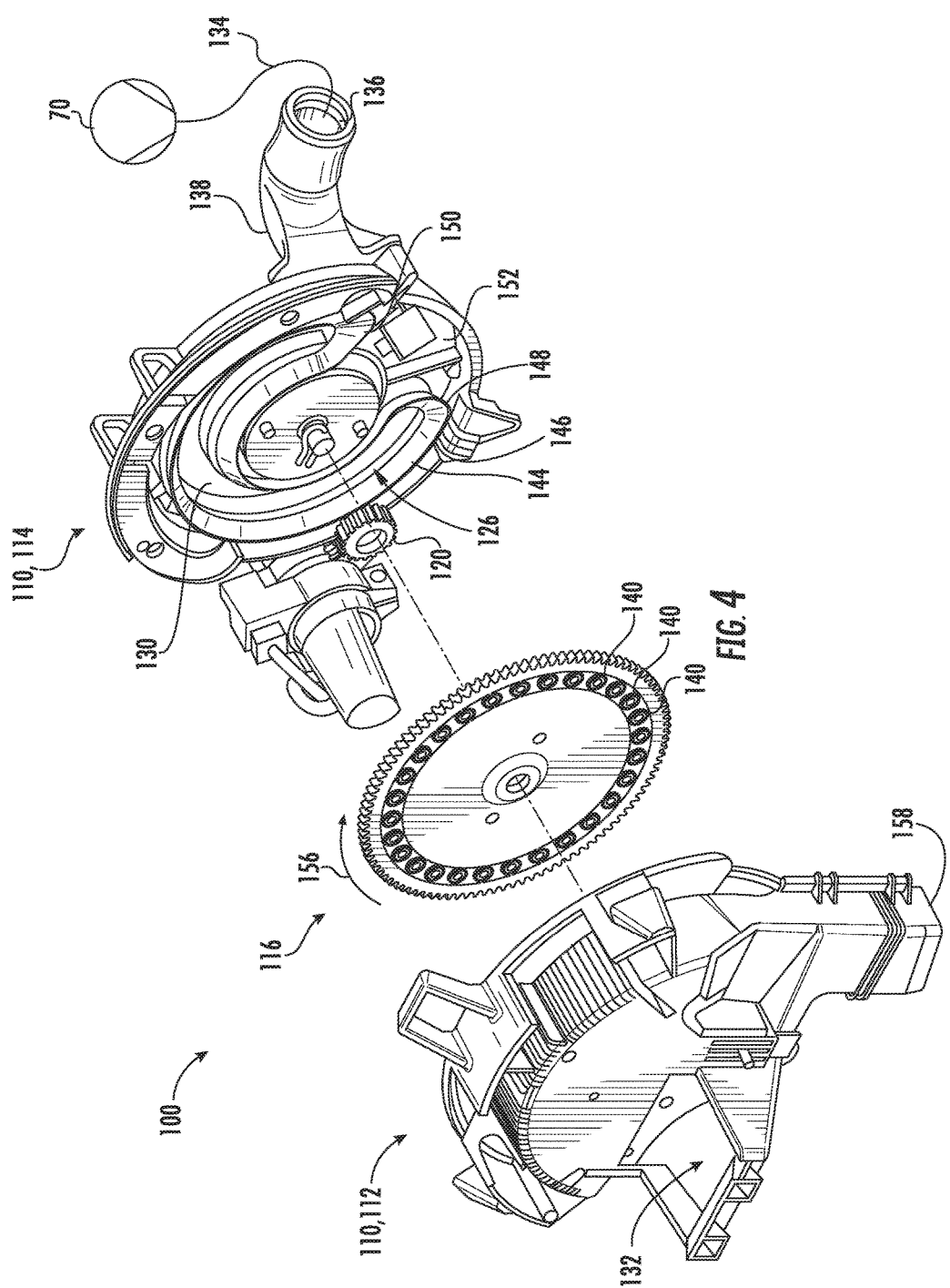
FIG. 4 illustrates a perspective, exploded view of one embodiment of a seed meter suitable for use within a row unit in accordance with aspects of the present subject matter.
Figure 5:
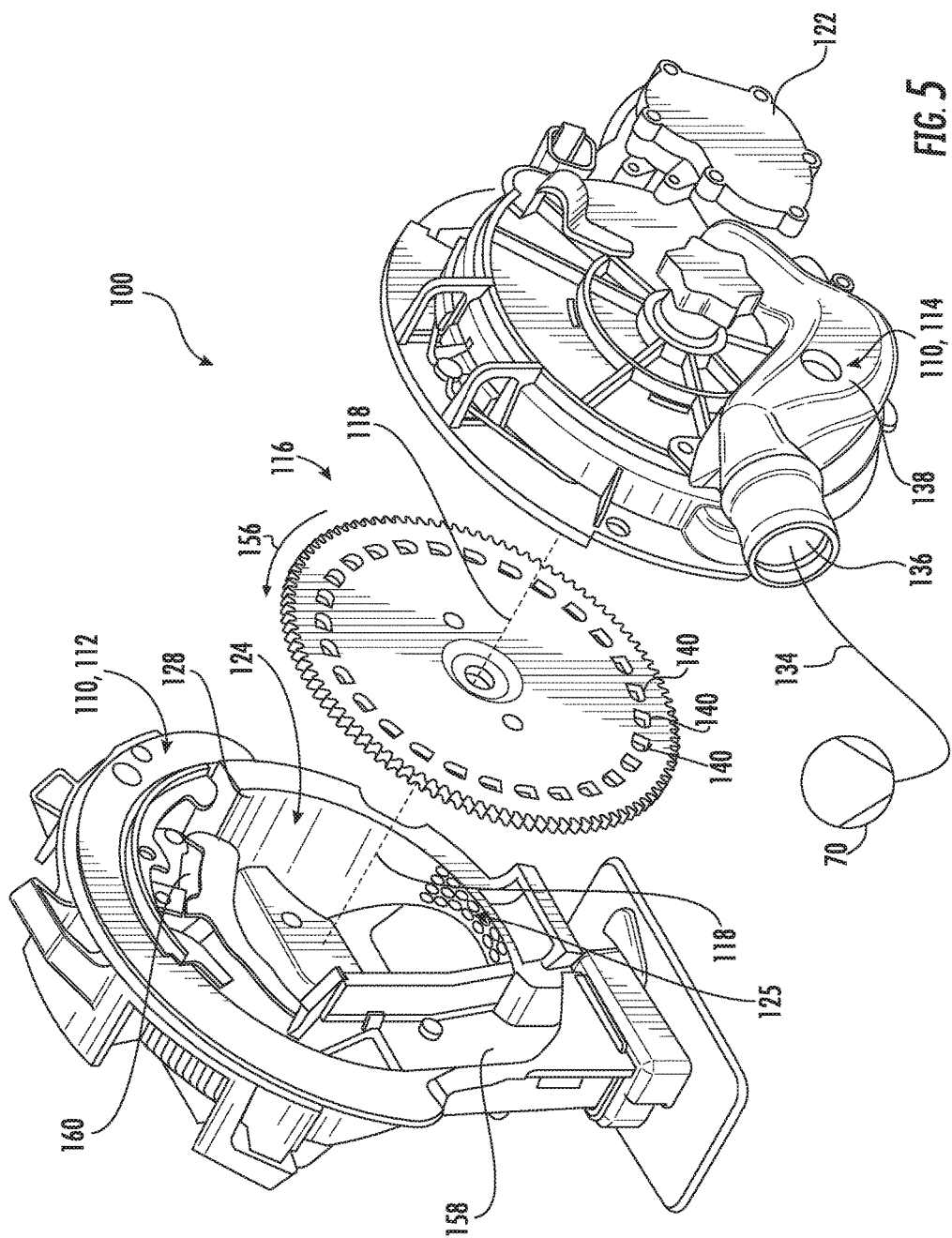
FIG. 5 illustrates another perspective, exploded view of the seed meter shown in FIG. 4.
Figure 6:
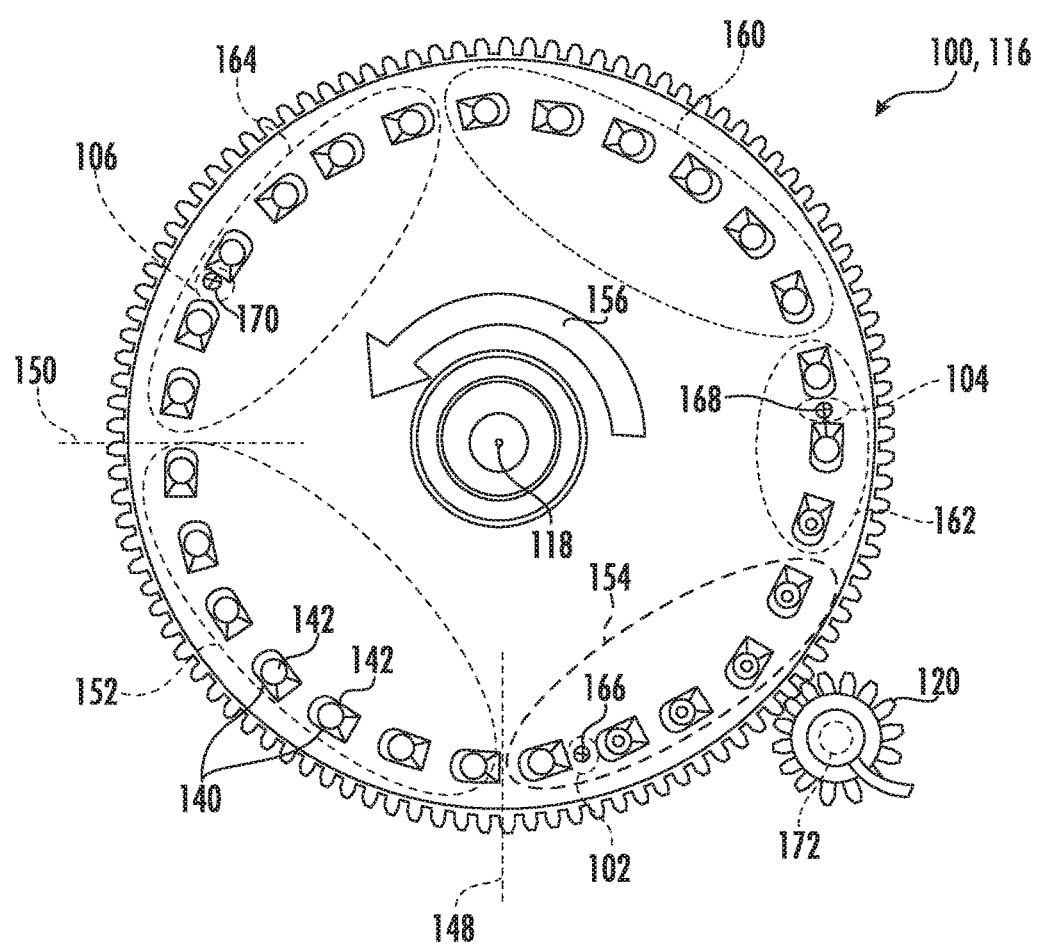
FIG. 6 illustrates a side view of a seed transport member of the seed meter shown in FIGS. 5 and 6, particularly illustrating various different regions that are defined relative to the seed transport member within the seed meter during operation thereof.

Referring now to FIGS. 4-6, several views of one embodiment of a seed meter 100 are illustrated in accordance with aspects of the present subject matter. Specifically, FIGS. 4 and 5 illustrate perspective, exploded views of the seed meter 100. Additionally, FIG. 6 illustrates an example view of a seed transport member of the seed meter, particularly illustrating a plurality of sensors that may be installed within the seed meter 100 at differing locations relative to the seed transport member.

In general, the seed meter 100 may include an outer housing 110 configured to encase the various internal components of the meter 100. As shown in FIGS. 4 and 5, the housing 110 may, for example, correspond to a multi-piece assembly, such as by including a seed-side housing component 112 and a vacuum-side housing component 114 configured to be coupled to each other to form the housing 110. Additionally, the seed meter 100 includes a seed transport member 116 configured to be disposed between the housing components 112, 114 within the interior of the seed meter 100. As is generally understood, the seed transport member 116 is carried by the housing 110 about a central axis of rotation (indicated by line 118 in FIG. 5). It should be appreciated that, while the illustrated embodiment of the seed transport member 116 corresponds to a rigid planer disc, the seed transport member 116 can take on any other suitable configuration, such as, for example, the shape of a bowl, a bowler hat, a top hat, a conic, a drum, or any other shape that is symmetric about a central axis of rotation. Moreover, as shown in FIG. 4, in one embodiment, the outer edge of the seed transport member 116 may be be configured to engage and be driven by a drive sprocket 120 that is rotatably driven in turn by a meter drive member 122 (FIG. 5), such as a motor, that can be operatively connected and controlled by an associated controller 202 (FIG. 7) to effect rotation of the seed transport member 116 within the housing 110 about the central axis 118.

In one embodiment, both a seed chamber 124 (FIG. 5) and a vacuum chamber 126 (FIG. 4) may be defined within the interior of the seed meter 100 along opposed sides of the seed transport member 116. For instance, as shown in FIG. 5, the seed chamber 124 may be configured to be defined between one side of the seed transport member 116 and an associated seed chamber wall 128 of the seed-side housing component 112. As is generally understood, at least a portion of the seed chamber 124 may define a seed pool 125 (FIG. 5) within which seeds are retained within the seed meter 100 prior to being picked up by the seed transport member 116. Similarly, as shown in FIG. 4, the vacuum chamber 126 may be configured to be defined between the opposed side of the seed transport member 116 and an associated vacuum chamber wall 130 of the vacuum-side housing component 114. In such an embodiment, seeds supplied to the seed meter 100 from the hopper(s) (e.g., via a seed input port 132 (FIG. 4) defined through the seed-side housing component 112) may be delivered into the seed pool 125 defined within the seed chamber 124. By applying a vacuum to the seed transport member 116 along the side of the seed transport member 116 opposite the seed chamber 124, the seeds contained within the seed chamber 124 may be attached to the seed transport member 116 and subsequently carried with rotation of the seed transport member 116 for discharge from the seed meter 100. As shown schematically in FIGS. 4 and 5, the vacuum chamber 126 of the seed meter 100 may be connected to the associated vacuum source 70 via a suitable vacuum conduit 134. For instance, the vacuum conduit 134 may be coupled to a vacuum port 136 of a vacuum manifold 138 forming part of or otherwise provided in operative association with the vacuum-side housing component 114. As such, a negative pressure from the vacuum source 70 may be applied through the vacuum conduit 134 and associated vacuum manifold 138 to create a vacuum within the vacuum chamber 126 that causes the seeds within the seed chamber 124 to become attached to the opposed side of the seed transport member 116.

As particularly shown in FIG. 6, a plurality of seed cells 140 may be defined around a perimeter region of the seed transport member 116. Specifically, the seed cells 140 may be spaced uniformly apart from each other around the perimeter of the seed transport member 116 so that constant rotation of the seed transport member 116 results in a commensurately constant rate at which a seed cell 140 passes a given fixed point within the seed meter 100. As particularly shown in FIG. 6, each seed cell 140 includes an opening 142 defined through the seed transport member 116, thereby allowing the vacuum provided along the opposed side of the seed transport member 116 to be applied through the seed transport member 116 for picking-up a corresponding seed at a given location within the seed meter 100.

As particularly shown in FIG. 4, a sealing gasket 144 may be disposed between the vacuum channel wall 130 and the seed transport member 116 and may define a sealing edge 146 that seals against the adjacent side of the seed transport member 116 facing toward the vacuum channel wall 130 when the seed meter 100 is fully assembled. Thus, as shown in FIG. 4, the seed transport member 116, in combination with the vacuum channel wall 140 and the sealing gasket 144, may collectively define the vacuum chamber 126, which, in the illustrated embodiment generally extends continuously about three quarters of the way around the circumference of the seed transport member 116. Moreover, as shown in FIG. 4, the vacuum chamber 126 may be configured and confined to be coincident with the perimeter portion of the seed transport member 116 around which the seed cells 140 are defined. Accordingly, at any given time when the vacuum source 70 is being operated to impose a negative pressure inside the vacuum chamber 126, a given portion of the seed transport member 116 (e.g., about one quarter of the seed transport member 116 in the illustrated embodiment) will not be subjected to the negative pressure, while the remaining portion of the seed transport member 116 (e.g., three quarters of the seed transport member 116 in the illustrated embodiment) will be subjected to the vacuum or suction force of the vacuum source 70. Thus, as schematically shown in FIG. 6, for example, the circumferential portion of the seed transport member 116 that extends between a proximal end 148 and distal end 150 of the vacuum chamber 126 and that is not subjected to the negative pressure established therein, generally coincides with the seed meter's post-delivery region (indicated by dashed oval 152 in FIG. 6). As is generally understood, the post-delivery region 152 generally extends within the seed meter from the location at which the seeds are designed to separate from the seed transport element 116 (e.g., following rotation past the distal end 150 of the vacuum chamber 126) and the location at which the seed cells 140 are reintroduced to the seed pool within the seed chamber 124 of the seed meter 100 (e.g., following rotation past the proximal end 148 of the vacuum chamber 126)

Similarly, the circumferential portion of the seed transport member 116 that is actually subjected to the negative pressure established within the vacuum chamber 126 may generally correspond to the seed delivery or transport region for the seed meter 100. As particularly shown in FIG. 6, this "seed transport region" of the seed meter 100 may be subdivided into various smaller regions. For instance, a seed acquisition region (indicated by dashed oval 154 in FIG. 6) may be defined that generally encompasses the portion of the seed chamber 124 at which seeds are initially staged or retained for subsequent pick-up by the seed transport member 116 for transport through the remainder of the seed transport region (e.g., in the direction of arrow 156 shown in FIG. 6). The seed acquisition region 154 may also be referred to herein as forming all or a portion of the "seed pool" for the seed meter 100. As the seed transport member 116 delivers a seed through the seed transport region, the seed cell 140 carrying the seed is eventually rotated past the distal end 150 of the vacuum chamber 126 and into the post-delivery region 152, at which point the seed may drop from the seed cell 140 due to the absence of vacuum being applied to the seed transport member 116 for subsequent discharged from the seed meter 100 via a seed output port 158 (FIG. 5) of the meter 100. Additionally, as shown in FIG. 6, when the seed meter 100 includes a singulator (schematically indicated by dashed oval 160 in FIG. 6), the seed transport region may also be sub-divided into a pre-singulation region (indicated by dashed oval 162 in FIG. 6) defined between the singulator 160 and the seed acquisition region 154 and a post-singulation region (indicated by dashed oval 164 in FIG. 6) defined between the singulator 160 and the post-delivery region 152 (or the distal end 150 of the vacuum chamber 126). Thus, seeds picked up by the seed transport member 116 within the seed acquisition region 154 are transported past the pre-singulation region 162 before encountering the singulator 160 and are then transported past the post-singulation region 164 prior to being rotated into the post-delivery region 152.

As indicated above, a plurality of sensors may also be provided in operative association with the seed meter 100. For instance, as shown schematically in FIG. 6, the seed meter 100 may, in one embodiment, include a seed pool sensor 102, a pre-singulation sensor 104, and a post-singulation sensor 106 positioned within the housing 110 for monitoring one or more operating parameters of the seed meter 100. However, it should be appreciated that, in other embodiments, the seed meter 100 may include any other combination of the above-referenced sensors and/or any other additional sensors consistent with the description provided herein (e.g., a vacuum sensor 78 and/or an airflow sensor 79 (FIG. 2)). In one embodiment, all or a portion of the above-described sensors 102, 104, 106 may be mounted or otherwise positioned along the vacuum-side of the seed meter 100, thereby preventing dust or other contaminants from building-up on the sensors 102, 104, 106. For instance, the sensors 102, 104, 106 may be mounted within or relative to the vacuum-side housing component 114 such that the sensing end of each sensor 102, 104, 106 is positioned within or adjacent to the vacuum chamber 126.

In general, the seed pool sensor 102 may correspond to any suitable sensor or sensing device configured to monitor the presence or absence of seeds within one or more of the seed cells 140 passing through the seed acquisition region 154 of the seed meter 100 and/or within the portion of the seed chamber 124 generally aligned with the seed acquisition region 154 of the seed meter 100. As such, in several embodiments, the seed pool sensor 102 may be configured to provide an indication of the amount of seeds remaining within the seed pool 125 defined within the seed chamber 124. For instance, in one embodiment, the seed pool sensor 102 may have a detection zone that is directed towards the portion of the seed transport member 116 that passes through the relatively lowest region of the seed chamber 124. As such, since seeds will tend to move toward the bottom of the seed chamber 124 due to the influence of gravity, the seed pool sensor 102 may detect the presence or absence of seeds at this lower portion of the seed acquisition region 154 to provide an indication of the amount of seeds remaining within the seed pool 125.

In one embodiment, the seed pool sensor 102 may be positioned within the seed meter 100 such that its detection zone is aligned with a location within the seed acquisition region 152 across which the seed cells 140 are moved with rotation of the seed transport member 116 (e.g., at the detection zone designated by circle 166 in FIG. 6). In such an embodiment, the seed pool sensor 102 may be configured to directly detect the presence or absence of seeds within the seeds cells 140 as the cells 140 pass by the location of the sensor 102. For instance, the seed pool sensor 102 may, in one embodiment, correspond to an optical sensor (e.g., a break-beam sensor having an emitter positioned on one side of the seed transport member 116 and a receiver positioned on the opposed side of the seed transport member 116 or a reflectance-based optical sensor positioned on one side of the seed transport member 116, such as the vacuum side) that is configured to emit a beam of light towards the location of the passing seed cells 140. By detecting the presence or absence of light passing through the seed transport member 116 and/or by analyzing the properties of the light reflected back to the sensor 102, the seed pool sensor 102 may detect the presence or absence of seeds within the passing seed cells 140, which may provide an indication of the amount of seeds remaining within the seed pool 125 defined within the seed chamber 124. For example, as the seed pool 125 begins to become starved of seeds, the seed pool sensor 102 may detect a reduction in the ratio of filled seed cells to empty seed cells as one or more empty seed cells are sensed by the seed pool sensor 102. In such instance, as will be described below, the detection of a given percentage of empty seed cells may be an indicator that the seed meter 100 has become substantially starved of seeds.

In another embodiment, as opposed to being directed towards the seed cells 140 passing through the seed acquisition region 154, the detection zone of the seed pool sensor 102 may be directed towards any other suitable location that allows the seed pool sensor 102 to provide an indication of the amount of seeds remaining within the seed pool 125 defined within the seed chamber 124. For example, in another embodiment, the seed pool sensor 102 may be configured to detect the fill-level or vertical height of the seeds within the seed chamber 124. In such an embodiment, the seed pool sensor 102 may, for instance, correspond to an optical sensor (e.g., a laser sensor), a capacity proximity sensor, and/or any other suitable sensor that detects the fill-level of the seeds within the seed chamber 124, such as by detecting when the fill-level of the seeds drops below a predetermined location or vertical height within the seed chamber 124 or by continuously detecting the fill-level or vertical height of the seeds within the seed chamber 124.

Additionally, in several embodiments, the pre-singulation sensor 104 and the post-singulation sensor 106 may generally be configured to detect the presence or absence of seeds contained within the seed cells 140 being conveyed immediately upstream of the singulator 160 and immediately downstream of the singulator 160, respectively. For instance, in one embodiment, the pre-singulation sensor 104 may be positioned within the seed meter 100 such that its detection zone is aligned with a location within the pre-singulation region 162 across which the seed cells 140 are moved with rotation of the seed transport member 116 (e.g., at the detection zone designated by circle 168 in FIG. 6) while the post-singulation sensor 106 may be positioned within the seed meter 100 such that its detection zone is aligned with a location within the post-singulation region 164 across which the seed cells 140 are moved with rotation of the seed transport member 116 (e.g., at the detection zone designated by circle 170 in FIG. 6). In such an embodiment, each of the sensors 104, 106 may, for instance, correspond to an optical sensor (e.g., a break-beam sensor having an emitter positioned on one side of the seed transport member 116 and a receiver positioned on the opposed side of the seed transport member 116 or a reflectance-based optical sensor positioned on one side of the seed transport member 116, such as the vacuum side) that is configured to emit a beam of light towards the location of the passing seed cells 140. By detecting the presence or absence of light passing through the seed transport member 116 and/or by analyzing the properties of the light reflected back to each sensor 104, 106, the pre- and post-singulation sensors 104, 105 may detect the presence or absence of seeds within the passing seed cells 140.

Moreover, in several embodiments, the seed meter 100 may also include a rotary encoder 172 configured to monitor the extent of rotational travel of the seed transport member 116. For instance, as shown in FIG. 6, the rotary encoder 172 may be provided in operative association with the drive sprocket 120 configured to rotationally drive the seed transport member 116. As such, by detecting the rotation of the drive sprocket 120 via the encoder 172, the angular extent across which the seed transport member 116 has been rotated can be determined. For instance, when the rotary encoder 172 corresponds to an optical encoder, the pulse signals received from the optical encoder may be used to determine the extent to which the seed transfer member 116 has been rotated by knowing the gear ratio defined between the drive sprocket 120 and the seed transfer member 116. In an alternative embodiment, the rotary encoder 172 may be configured to directly monitor the rotational travel of the seed transfer member 116, such as by being provided in operative association with a shaft or bearing (not shown) about which the seed transfer member 116 rotates.

It should be appreciated that the configuration of the seed meter 100 described above and shown in FIGS. 4-6 is provided only to place the present subject matter in an exemplary field of use. Thus, it should be appreciated that the present subject matter may be readily adaptable to any manner of seed meter configuration.

Figure 7:
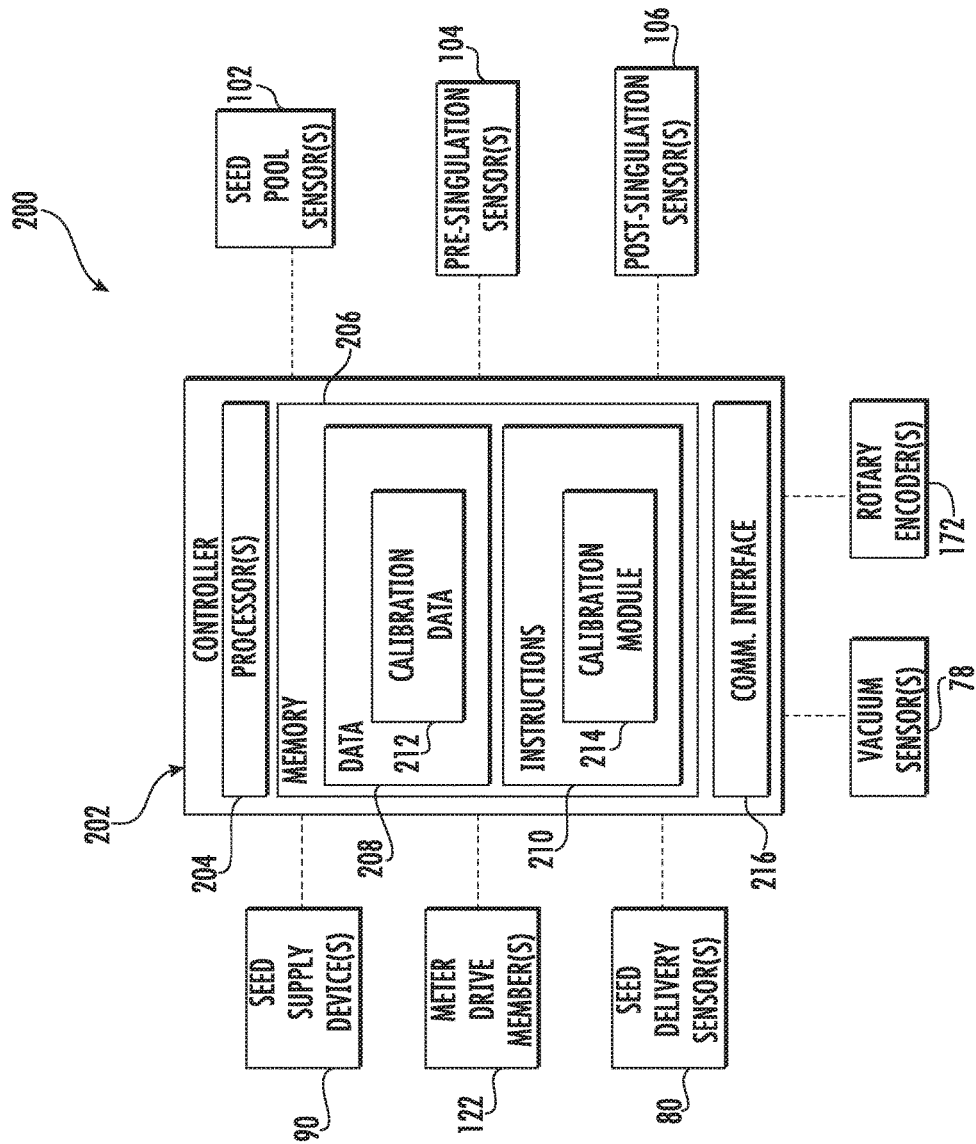
FIG. 7 illustrates a schematic view of one embodiment of a system for calibrating a multi-variety seed meter in accordance with aspects of the present subject matter.

Referring now to FIG. 7, a schematic view of one embodiment of a system 200 for calibrating a multi-variety seed meter is illustrated in accordance with aspects of the present subject matter. In general, the system 200 will be described herein with reference to the planting implement 20, the row unit 28, and the seed meter 100 described above with reference to FIGS. 1, 2 and 4-6, as well as the seed supply arrangement shown in FIG. 3. However, it should be appreciated that the disclosed system 200 may generally be utilized with any planter or seeder having any suitable implement configuration, with row units having any suitable row unit configuration, and/or with seed meters having any suitable meter configuration. Similarly, the disclosed system 200 may generally be utilized with any suitable seed supply arrangement for regulating the supply of seeds to the seed meter 100 of a row unit 28.

In several embodiments, the system 200 may include a controller 202 and various other components configured to be communicatively coupled to and/or controlled by the controller 202, such as a meter drive member 122 configured to rotationally drive the seed meter 100, a seed supply device 90 configured to regulate the supply of seeds to the seed meter 100, and/or various sensors configured to monitor one or more operating parameters associated with the seed meter 100 (e.g., a seed pool sensor 102, a pre-singulation sensor 104, a post-singulation sensor 106, a rotary encoder 172, a vacuum sensor 78, an airflow sensor 79, and/or a seed delivery sensor 80). As will be described below, the controller 202 may be configured to execute one or more calibration routines for calibrating one or more parameter values determined based on data received from at least one of the "fill status" sensors configured to provide an indication of the amount of seeds remaining within the seed pool 125 of the seed meter 100. For instance, in one embodiment, the disclosed calibration routine(s) may be used to calibrate a starvation parameter value determined based on data received from one or more of the sensors configured to directly detect the presence, absence and/or fill-level of the seeds within the seed pool 125 defined within the seed chamber 124. By calibrating such monitored starvation parameter, the relevant sensor(s) may be used during the performance of a multi-variety planting operation to more accurately and reliably detect when a seed meter 100 is about to be starved of seeds of a given seed type, thereby allowing the seed type to be switched (e.g., via control of the associated seed supply device 90) to another seed type without substantial overlap between the two seed types. Additionally, in the case of an active seed dosage or pre-metered seed supply system, the calibrated starvation parameter value may be used to determine when to supply an additional dose or pre-metered amount of seeds to the seed meter 100, regardless of whether the seed type is being currently switched.

For purpose of description, the various calibration routines will generally be described herein as being used to calibrate starvation parameter values determined based on data received from the seed pool sensor 102. However, it should be appreciated that, in other embodiments, the calibration routines may also be used to calibrate parameter values determined based on data received from any other fill status sensors configured to directly detect the presence, absence and/or fill-level of seeds within the interior of the seed meter 100, such as the pre-singulation sensor and/or the post-singulation sensor. Moreover, in alternative embodiments, the disclosed calibration routines may also be used to calibrate parameter values determined based on data received from any sensors configured to indirectly detect the presence, absence and/or fill-level of the seeds within the interior of the seed meter 100, such as the seed delivery sensor 80, the airflow sensor 79, and/or the vacuum sensor 78.

In general, the controller 202 may correspond to any suitable processor-based device(s), such as a computing device or any combination of computing devices. Thus, as shown in FIG. 7, the controller 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204.

In several embodiments, the data 208 may be stored in one or more databases. For example, the memory 206 may include a calibration database 212 for storing sensor data, data associated with one or more parameter values derived from the sensor data, and/or other relevant data (e.g., operating interval data) collected during or otherwise associated the execution of the disclosed calibration routines. For instance, during the performance of a calibration routine, data from all or a portion of the sensors communicatively coupled to the controller 202 may be stored (e.g., temporarily) within the calibration database 212 and subsequently used to determine one or more parameter values associated with the operation of the seed meter 100 (e.g., starvation parameter values, operating interval values, etc.), with such determined parameter values being similarly stored within the calibration database 212. In doing so, the sensor data received from individual sensors (or the parameter value(s) derived from such sensor data) may be stored in isolation and/or correlated to sensor data received from other sensors (or other parameter values derived from other sensor data).

For example, as will be described below, starvation parameter values derived from data received from the seed pool sensor 102 may be stored in combination with data received from one or more other sensors that provides an indication of the relevant operating interval(s) for the seed meter 100 during performance of the calibration routine, thereby allowing the starvation parameter values to be correlated to such operating interval(s).

Referring still to FIG. 7, in several embodiments, the instructions 210 stored within the memory 206 of the controller 202 may be executed by the processor(s) 204 to implement a calibration module 214. In general, the calibration module 214 may be configured to execute one or more of the disclosed calibration routines for calibrating the parameter value(s) derived from the data received from one or more of the various sensors described herein. For instance, in one embodiment, the calibration module 214 may be configured to execute one or more static or non-planting calibration routines, such as the routines 300, 500 described below with reference to FIGS. 8 and 11. In another embodiment, the calibration module 214 may be configured to execute one or more dynamic or in-field calibration routines, such as the routine 700 described below with reference to FIG. 15. In addition, the calibration module 214 may also be configured to implement one or more aspects of the various methods described herein, such as the calibration methods 400, 600, 800 described below with reference to FIGS. 10, 14, and 16.

Moreover, as shown in FIG. 7, the controller 202 may also include a communications interface 216 to provide a means for the controller 202 to communicate with any of the various other system components described herein. For instance, one or more communicative links or interfaces (e.g., one or more data buses) may be provided between the communications interface 216 and both the meter drive member 122 and the seed supply device 90 to allow the controller 202 to transmit control signals for controlling the operation of such components. Similarly, one or more communicative links or interfaces (e.g., one or more data buses) may be provided between the communications interface 216 and the various sensors to allow the associated sensor data to be transmitted to the controller 202.

It should be appreciated that, in general, the controller 202 of the disclosed system 200 may correspond to any suitable computing device(s) that is configured to function as described herein. In several embodiments, the controller 202 may form part of an active planting system configured to perform a multi-variety planting operation, such as by corresponding to a vehicle controller of a work vehicle configured to tow an associated planter 20 and/or an associated implement controller of the planter 20. In such embodiments, the controller 202 may be configured to execute the static calibration routines and/or the in-field calibration routines described herein to calibrate the sensor data for one or more sensors. Alternatively, the controller 202 may form part of a test stand or other system for obtaining calibration data associated with the operation of a seed meter. For instance, when implemented as a test stand controller, the controller 202 may be configured to execute the static calibration routine(s) described herein to calibrate the sensor data for one or more sensors. In such an embodiment, it should be appreciated that the controller 202 may not be communicatively coupled to one or more of the system components shown in FIG. 7, such as the meter drive member 122 and/or the seed supply device 90. For instance, the operation of such component(s) may be controlled via a different source (e.g., manually or via a separate controller).

Figure 8:
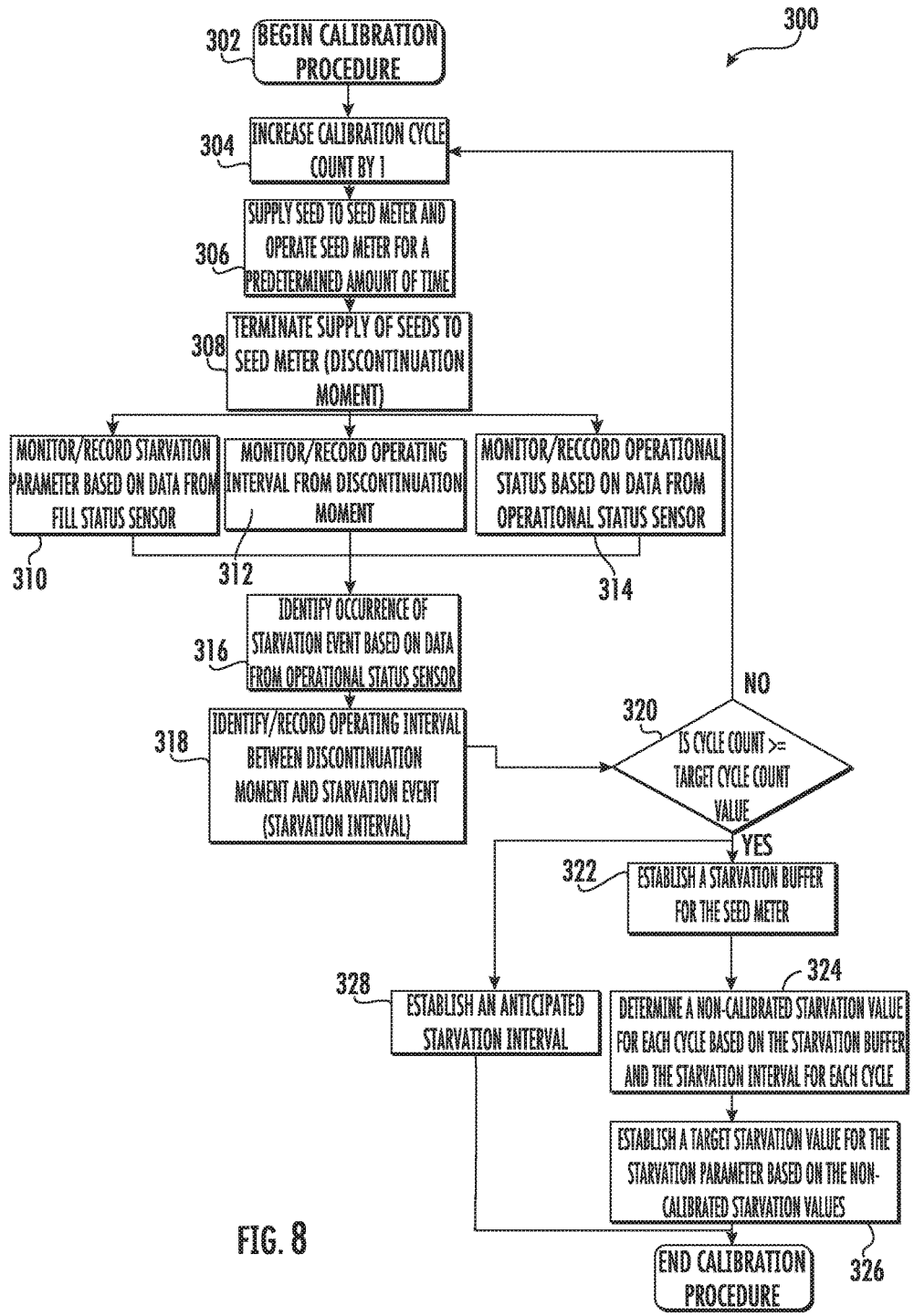
FIG. 8 illustrates a flow diagram of one embodiment of a calibration routine that may be executed when calibrating a multi-variety seed meter in accordance with aspects of the present subject matter.

Referring now to FIG. 8, a flow diagram of one embodiment of a static calibration routine 300 that may be executed when calibrating a multi-variety seed meter is illustrated in accordance with aspects of the present subject matter. In general, the calibration routine 300 will be described herein as being implemented by the controller 202 of the system 200 described above with reference to FIG. 7. However, it should be appreciated that the various processes described below may alternatively be implemented by another computing device or any combination of computing devices. In addition, although FIG. 8 depicts control steps or functions performed in a particular order for purposes of illustration and discussion, the calibration routines discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 8, upon initiation of the calibration routine 300 (e.g., at (302)), a calibration cycle count for the calibration routine 300 is increased by a value of one (e.g., at (304)). For instance, at initiation of the calibration routine 300, the calibration cycle count will be equal to zero. Thus, the calibration cycle count is initially increased to one for the first calibration cycle. Thereafter, at (306), a supply of seeds is initiated to the seed meter 100 and the seed meter 100 is then allowed to operate for a predetermined amount of time. For instance, it may be desirable for the seed meter 100 to be operated for a sufficient period of time to allow the seed meter 100 to obtain or reach steady state operation. As indicated above, in one embodiment, the supply of seeds to the seed meter 100 may be initiated, for example, by controlling the operation of the seed supply device(s) 90 provided in operative association with the seed meter 100.

Additionally, after operating the seed meter 100 for the predetermined time period, the calibration routine 300 may, at (308), include terminating the supply of seeds to the seed meter. For purposes of description, the moment at which the supply of seeds is terminated to the seed meter 100 will be referred to as the "discontinuation moment." As indicated above, in one embodiment, the supply of seeds to the seed meter 100 may be terminated, for example, by controlling the operation of the seed supply device(s) 90 provided in operative association with the seed meter 100. Upon termination of the supply of seeds to the seed meter 100, the seed meter 100 may continue to be operated to allow seeds to be discharged therefrom.

Moreover, upon termination of the supply of seeds to the seed meter 100 and as the seed meter 100 continues to be operated, the controller 202 may be configured to begin monitoring and recording (or continue to monitor and record) one or more operating parameters associated with the seed meter 100 based on various types of sensor data received by the controller 202. For instance, as shown in FIG. 8, at (310), the controller 202 may be configured to monitor and record starvation parameter data derived from the data received from one or more fill status sensors configured to provide an indication of the amount of seeds remaining within the seed pool 125 of the seed meter 100. For purposes of describing the calibration routine 300, the fill-status sensor(s) will be described herein as corresponding to the seed pool sensor 102. As described above, the seed pool sensor 102 may be configured to directly detect the presence, absence and/or fill-level of seeds within the seed pool 125, such as by detecting filled seed cells and/or empty seed cells moving past the sensor 102 or by detecting the fill-level of the seeds within the seed chamber 124 of the seed meter 100. However, in other embodiments, the fill-status sensor(s) may correspond to any other suitable sensor configured to provide an indication of the amount of seeds remaining within the seed pool 125 of the seed meter 100.

In one embodiment, the sensor data from the fill-status sensor(s) may provide an indication of a number of filled seed cells or empty seed cells detected by the sensor(s) across a given total number of seed cells passing the sensor(s). For instance, the sensor data may be used to calculate a rolling percentage of the filled seed cells and/or the empty seed cells detected by the sensor(s) out of a predetermined amount of total cells, e.g., a percentage of filled seed cells and/or empty seed cells detected out of the last certain number of seed cells passing the sensor(s) (e.g., the last 20 seed cells). Alternatively, the sensor data may simply correspond to a count of the filled seed cells and/or empty seed cells detected by the sensor(s) out of a predetermined amount of total cells, e.g., a count of the filled seed cells and/or empty seed cells detected out of the last certain number of seed cells passing the sensor(s) (e.g., the last 20 seed cells).

Additionally, as shown in FIG. 8, at (312), simultaneous with monitoring and recording the starvation parameter data based on the data received from the fill status sensor(s), the controller 202 may also be configured to monitor and record the current operating interval for the seed meter 100 from the instance at which the supply of seeds was terminated (i.e., the discontinuation moment). In several embodiments, the operating interval may be monitored based on sensor feedback received from one or more sensors. For instance, in one embodiment, the operating interval may be measured based on a number of pulses or sensor signals received from the rotary encoder 172 described above. In such an embodiment, the operating interval monitored by the controller 202 may correspond to or be based upon the extent to which the seed transport member 116 has been rotated following the discontinuation moment. In another embodiment, the operating interval monitored by the controller 202 may correspond to or be based upon the number of total seed cells and/or the number of filled seed cells passing a given location within the seed meter 100. For instance, in such an embodiment, the pre-singulation sensor 104 and/or the post-singulation sensor 106 may be configured to monitor the number of total seed cells and/or the number of filled seed cells passing immediately upstream or downstream of the singulator 160. In a further embodiment, the operating interval monitored by the controller 202 may correspond to or be based upon the number of seeds discharged from the seed meter 100. In such an embodiment, the number of seeds discharged may, for example, be monitored using the seed delivery sensor 80 or any other sensor used to detect seeds between the seed meter 100 and the furrow or seed trench.

Moreover, at (314), simultaneous with monitoring/recording the starvation parameter data and monitoring/recording the current operating interval for the seed meter 100, the controller 202 may be configured to monitor and record additional operational status data for the seed meter 100 derived from data received from one or more other "operational status" sensors communicatively coupled to the controller 202. In one embodiment, the operational status sensor(s) may correspond to any suitable sensor(s) other than the fill-status sensor(s) that monitors or provides an indication of the operational status or a related parameter of the seed meter 100. For example, when the fill-status sensor(s) corresponds to the seed pool sensor 102, the operational status sensor(s) may correspond to any other suitable sensor configured to directly or indirectly monitor the operation of the seed meter 100, such as the pre-singulation sensor 104, the post-singulation sensor 106, the seed delivery sensor 80, the airflow sensor 79, and/or the vacuum sensor 78.

Referring still to FIG. 8, at (316), the controller 202 may be configured to identify the occurrence of a starvation event for the seed meter 100 based on the sensor data received from the operational status sensor(s). As used herein, a "starvation event" generally refers to the instance during operation of the seed meter 100 at which the seeds contained within the seed pool 125 have been substantially evacuated therefrom such that the seed meter 100 begins to initially show signs that the seed pool 125 will soon be starved of seeds. Thus, it should be appreciated that the seed pool 125 will still contain a number of seeds at the occurrence of the starvation event, but such number will be substantially less than its typical full seed count during normal operation of the seed meter 100, such as less than 25% of the typical full seed count or less than 20% of the typical full seed count or less than 15% of the typical full seed count or less than 10% of the typical full seed count or less than 5% of the typical full seed count.

In general, the starvation event may be identified by detecting a given change in one or more operating parameters or states associated with the seed meter 100 that provide an indication that the seed pool 125 is about to be starved of seeds. For instance, in one embodiment, the starvation event can be identified by detecting when the number of seed skips across a given number of anticipated seeds passing through the seed tube 72 (or other seed delivery mechanism) exceeds a first predetermined seed skip threshold. In such an embodiment, the controller 202 may, for example, monitor the data from the seed delivery sensor 80 to identify the occurrence of the starvation event. For instance, upon detecting that the number of seed skips across a given number of anticipated seeds (e.g., 20 seeds) exceeds the predetermined seed skip threshold (e.g., 3 seed skips), the controller 202 may be configured to identify the instance of the first seed skip within the group of detected seed skips as the moment of the occurrence of the starvation event.

In another embodiment, the starvation event can be identified by detecting when the vacuum pressure applied to the seed transport member 116 drops from a relatively steady operating pressure to a relatively steady, lower operating pressure. In such an embodiment, the controller 202 may, for example, monitor the sensor data from the vacuum sensor 78 to identify the occurrence of the starvation event. For instance, upon detecting that the vacuum pressure has dropped from a first operating pressure corresponding to the typical steady state operating pressure for the seed meter 100 to a lower operating pressure and has remained at such lower operating pressure for a given time period, the controller 202 may be configured to identify the instance at which the operating pressure initially dropped as the moment of the occurrence of the starvation event.

In yet another embodiment, the starvation event can be identified by detecting when the airflow level applied to the seed transport member 116 increases from a relatively steady operating airflow to a relatively steady, higher operating airflow. In such an embodiment, the controller 202 may, for example, monitor the sensor data from the airflow sensor 79 to identify the occurrence of the starvation event. For instance, upon detecting that the airflow level applied to the seed transport member 116 has increased from a first operating airflow corresponding to the typical steady state operating airflow for the seed meter 100 to a higher operating airflow and has remained at such higher operating airflow for a given time period, the controller 202 may be configured to identify the instance at which the operating airflow initially increased as the moment of the occurrence of the starvation event.

In a further embodiment, the starvation event can be identified by detecting when the number of open or empty seed cells within a given number of total seed cells passing a specific location within the seed meter exceeds a first predetermined empty cell threshold. In such an embodiment, the controller 202 may, for example, monitor the sensor data from the pre-singulation sensor 104 and/or the post-singulation sensor 106 to identify the occurrence of the starvation event. For instance, upon detecting that the number of empty seed cells across a given total number of seed cells passing the sensor location (e.g., 20 seed cells) exceeds the predetermined empty cell threshold (e.g., 3 cells), the controller 202 may be configured to identify the instance of the first empty seed cell within the group of detected empty seed cells as the moment of the occurrence of the starvation event.

Referring still to FIG. 8, at (318), the controller 202 may be configured to identify and record a starvation interval for the seed meter 100 defined between the instance at which the supply of seeds was initially terminated (i.e., the discontinuation moment) and the occurrence of the starvation event. As indicated above, the controller 202 may be configured to continuously monitor the current operating interval for the seed meter 100 following the discontinuation moment. Thus, upon detecting the occurrence of the starvation event, the controller 202 may be configured to identify the starvation interval for the seed meter 100 as corresponding to the operating interval between the discontinuation moment and the starvation event. For instance, in one embodiment, the starvation interval may correspond to or be based upon the extent to which the seed transport member 116 has been rotated between the discontinuation moment and the occurrence of the starvation event. In another embodiment, the starvation interval may correspond to or be based upon the number of total seed cells and/or the number of filled seed cells passing a given location within the seed meter 100 between the discontinuation moment and the occurrence of the starvation event.

As indicated above, the controller 202 may be configured to store various types of data within its memory 206 (e.g., within the calibration database 212) during each calibration cycle, such as data related to the monitored starvation parameter, the monitored operating interval, the operational status of the seed meter 100 and/or the starvation interval. As will be described below, such data may then be used by the controller 202 to calculate a final, target starvation value for the monitored starvation parameter that can be used to accurately assess the amount of seeds remaining within the seed pool 125 of the seed meter 100.

Moreover, as shown in FIG. 8, at (320), the controller 202 may be configured to determine whether the calibration cycle count for the calibration routine 300 is greater than or equal to a predetermined cycle count value. For instance, it may be desirable to execute the above-referenced calibration cycle (e.g., boxes 306-318) a given number times (e.g., 5 or more times) to acquire a sufficient amount of calibration data for the seed meter 100. In the event that the calibration cycle count for the calibration routine 300 is not greater than or equal to the predetermined cycle count value, the calibration routine 300 may return to 304 to allow for the execution of another calibration cycle.

However, as shown in FIG. 8, if the calibration cycle count for the calibration routine 300 is greater than or equal to the predetermined cycle count value, the controller 202 may, at (322), be configured to establish a starvation buffer to be applied for the calibration routine. In general, the starvation buffer may correspond to a safety margin or buffer value that is applied to the relative operating interval determined for each calibration cycle when determining a corresponding starvation value for such calibration cycle to ensure that the seed pool 125 is not completely starved of seed during the performance of a planting operation, which would lead to skips within the field. In one embodiment, the starvation buffer may correspond to a predetermined or fixed buffer value, such as a manufacturer-selected buffer value or an operator-selected buffer value.

Alternatively, the starvation buffer may be calculated based on a "sensing delay" interval defined as the operating interval across which the seed meter 100 is operated between the instance at which the fill status sensor(s) is configured to detect a given seed-related event at its location within the seed meter 100 (e.g., the presence or absence of a seed within a seed cell) and the instance at which the operational status sensor(s) is configured to detect such seed-related event at its separate location. For instance, in an embodiment in which the fill status sensor(s) corresponds to the seed pool sensor 102 and the operational status sensor(s) corresponds to the seed delivery sensor 80, the sensing delay interval may, for example, correspond to the operating interval for the seed meter 100 between the instance at which the seed pool sensor 102 detects a given seed (or lack thereof) within a seed cell and the instance at which the seed delivery sensor 80 detects such seed (or the lack thereof) passing through the seed tube 72 (or other seed delivery mechanism). In such an embodiment, the sensing delay interval may, for example, correspond to or be based upon the extent to which the seed transport member 116 has been rotated between the instance of the detection event by the seed pool sensor 102 and the instance of the corresponding detection event by the seed delivery sensor 80 or the sensing delay interval may correspond to or be based upon the number of total seed cells passing a given location within the seed meter 100 between the instance of the detection event by the seed pool sensor 102 and the instance of the corresponding detection event by the seed delivery sensor 80. It should be appreciated that, in embodiments in which the operational status sensor(s) corresponds to the pre-singulation sensor(s) 104 or the post-singulation sensor(s) 106, the sensing delay interval for the seed meter 100 may be reduced as compared to when the operational status sensor(s) corresponds to the seed delivery sensor 80 given the closer proximity of the pre-singulation sensor(s) 104 and the post-singulation sensor(s) 106 to the seed pool sensor 102 with the reference to the travel path or flow of seeds through the seed meter 100.

It should be appreciated that, when the starvation buffer is determined as a function of the sensing delay interval for the seed meter 100, the starvation buffer may, in one embodiment, be equal to the sensing delay interval. Alternatively, the starvation buffer may be determined based on both the sensing delay interval and an additional safety factor or margin for the seed meter 100. For instance, in one embodiment, the starvation buffer may be determined by summing both the sensing delay interval and the additional safety margin value. In such an embodiment, the additional safety margin value may be set based on user input, a lookup table, an applicable mathematical function or the additional safety margin value may simply correspond to a fixed value.

Referring still to FIG. 8, at (324), the controller 202 may be configured to assess the starvation parameter data stored for the various calibration cycles to determine a non-calibrated starvation value for each cycle based on the starvation interval associated with such calibration cycle and the starvation buffer. Specifically, for each calibration cycle, the controller 202 may be configured to retrieve the value for the monitored starvation parameter at the instance at which the operating interval for the seed meter 100 was equal to the starvation interval for such calibration cycle less the starvation buffer. The specific value for the monitored starvation parameter at such instance may then be identified as the non-calibrated starvation value for the associated calibration cycle.

Additionally, at (326), the controller 202 may be configured to establish a target starvation value for the starvation parameter based on the non-calibrated starvation values for the various calibration cycles that corresponds to the monitored value that is expected to be derived from the fill status sensor data received at, or shortly prior to, the occurrence of a starvation event for the seed meter 100. As a result, upon subsequent operation of the seed meter 100, the target starvation value for the starvation parameter may serve as an accurate and reliable indicator of the occurrence or imminent occurrence of a starvation event. In one embodiment, the non-calibrated starvation values recorded for the various calibration cycles may be averaged to determine the final, target starvation value for the starvation parameter. Alternatively, the average and standard deviation of the various non-calibrated starvation values may be used to calculate the target starvation value. Such a methodology may help to account for the level of variance in the starvation values collected during the various calibration cycles. For instance, in one embodiment, where the starvation parameter value decreases with decreasing seed levels, such as when defined by the percent filled cells detected by the fill status sensors, the target starvation value may be calculated according to the following equation (Equation 1):

$$TSV = AVG + 3 * STDDEV \quad (1)$$

wherein, TSV corresponds to the target starvation value, AVG corresponds to the average of the non-calibrated starvation values from the various calibration cycles, and STDDEV corresponds to the standard deviation of the non-calibrated starvation values from the various calibration cycles.

It should be appreciated that, in other embodiments, the target starvation value may be determined based on the various non-calibrated starvation values using any other suitable statistical method(s), such as by using the minimum value, the maximum value, the mean value, and/or the like.

Additionally, in several embodiments, the controller 202 may, at (328), also be configured to aggregate all of the operating interval data to determine an anticipated starvation interval for the seed meter 100. For instance, in one embodiment, the starvation operating intervals recorded for the various calibration cycles may be averaged to determine the final, anticipated starvation interval for the seed meter 100. As a result, upon subsequent operation of the seed meter 100, the anticipated starvation interval may serve as an accurate and reliable indicator of the occurrence or imminent occurrence of a starvation event. Alternatively, as will be described below with reference to FIG. 15, the anticipated starvation interval may serve as a means for evaluating the data being received from the fill status sensor.

Figure 9:
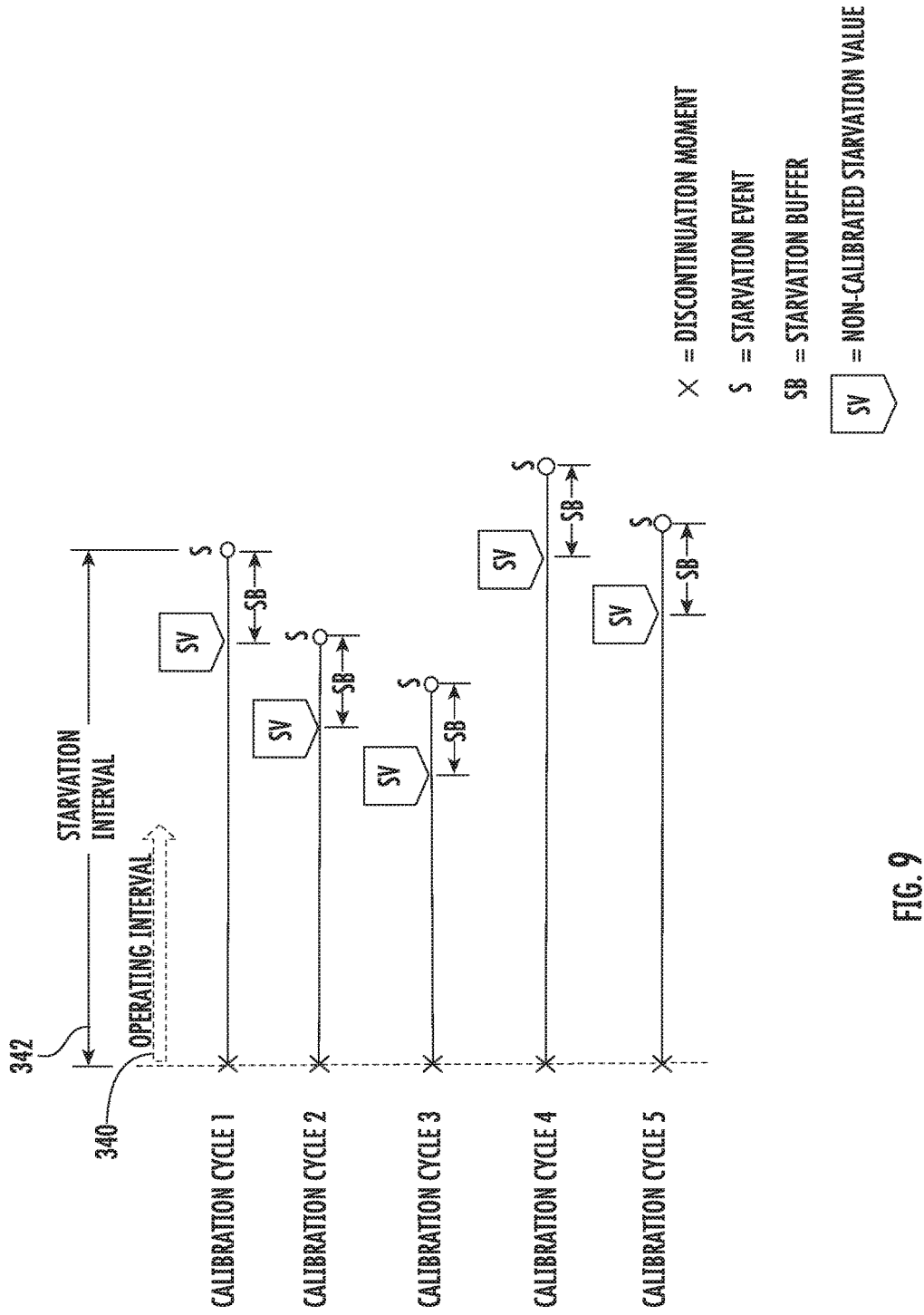
FIG. 9 illustrates a graphical view of example calibration data that may be obtained when performing a calibration routine in accordance with aspects of the present subject matter.

Referring now to FIG. 9, a graphical example of calibration data that may be obtained from a plurality of calibration cycles performed using the calibration routine 300 described above with reference to FIG. 8 is illustrated in accordance with aspects of the present subject matter. Specifically, FIG. 9 illustrates example data from five separate calibration cycles. As shown, during each calibration cycle, the supply of seeds to the seed meter was terminated at the discontinuation moment (identified by "X" in FIG. 9) and the subsequent operating interval was monitored (indicated by arrow 340) (e.g., using encoder data, cell count data, filled cell count data, and/or the like) as the operation of the seed meter 100 was continued to allow the discharge of seeds therefrom. Although not shown, sensor data from the associated fill status sensor(s) was also recorded during each calibration cycle. Additionally, as shown in FIG. 9, a Starvation Event ("S") was detected during each calibration cycle (e.g., using data from the operational status sensor, such as the associated seed delivery sensor 80, vacuum sensor 78, airflow sensor 79, pre-singulation sensor 104, post-singulation sensor 106, and/or the like). By detecting such events, a corresponding starvation interval 342 may also be identified for each calibration cycle between the discontinuation moment and the respective occurrences of the starvation events.

As indicated above, following the execution of the various calibration cycles, the associated data can be analyzed to determine a non-calibrated starvation value ("SV") for each calibration cycle. For instance, as shown in FIG. 9, to determine the instance across the operating interval for each calibration cycle at which the starvation parameter value should be retrieved, the starvation buffer ("SB") can be subtracted from the starvation interval identified for such calibration cycle. The starvation parameter value at such instance within each calibration cycle (identified in FIG. 9 by the enclosed "SV") may then be identified as the non-calibrated starvation value for such cycle. Thus, as shown in FIG. 9, by backtracking within the data from the starvation event identified for each calibration cycle by an amount equal to the starvation buffer, non-calibrated starvation values may be identified for the various calibration cycles.

Figure 10:
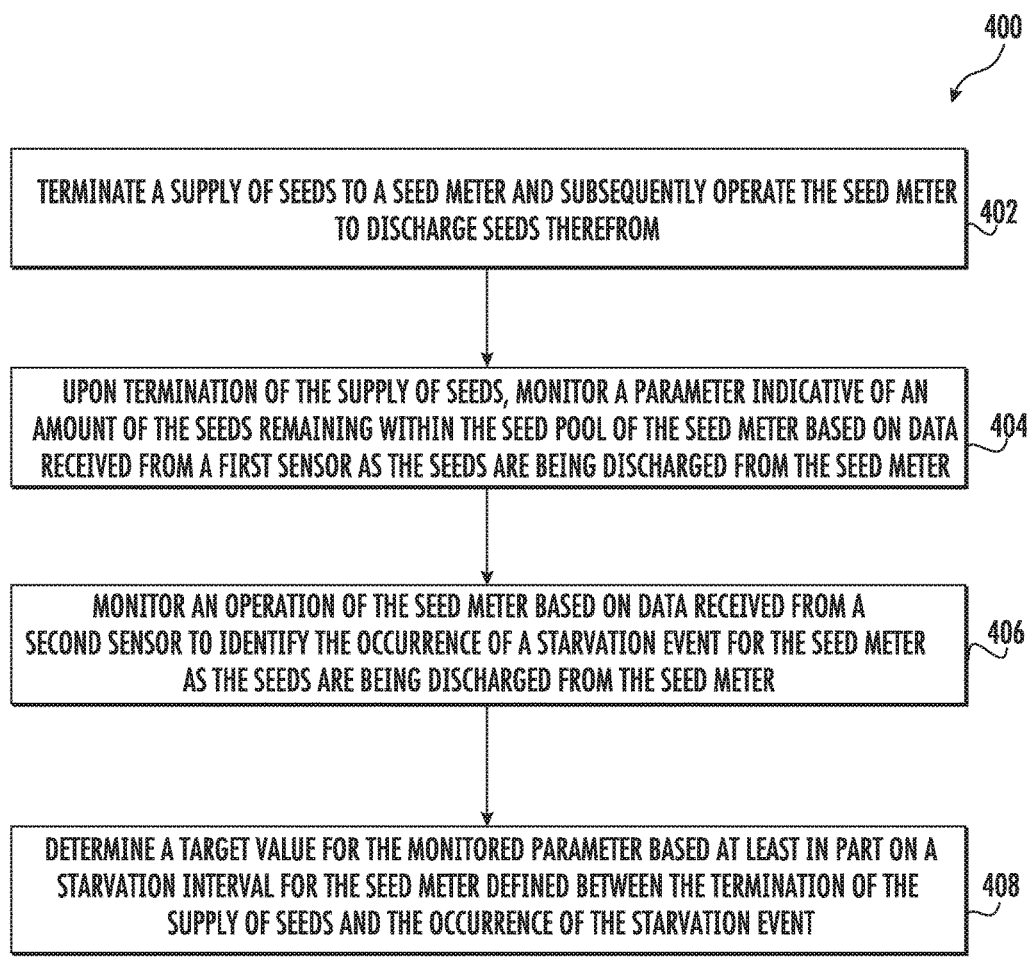
FIG. 10 illustrates a flow diagram of one embodiment of a calibration method for a multi-variety seed meter in accordance with aspects of the present subject matter.

Referring now to FIG. 10, a flow diagram of one embodiment of a calibration method 400 for a multi-variety seed meter is illustrated in accordance with aspects of the present subject matter. In general, the method 400 will be described herein with reference to the system 200 described above with reference to FIG. 7 and the calibration routine 300 described above with reference to FIG. 8. However, it should be appreciated by those of ordinary skill in the art that the disclosed method 400 may be implemented within any other system and/or using any other suitable calibration routine. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (402), the method 400 may include terminating the supply of seeds to a seed meter and subsequently operating the seed meter to discharge seeds therefrom. For instance, as indicated above, in one embodiment, the system controller 202 may be configured to control the operation of an associated seed supply device(s) 90 to terminate or shut-off the supply of seeds to the seed meter 100.

Additionally, at (404), the method 400 may include monitoring a parameter indicative of an amount of the seeds remaining within the seed pool of the seed meter based on data received from a first sensor as the seeds are being discharged from the seed meter upon termination of the seed supply thereto. For example, as indicated above, the controller 202 may be configured to monitor a starvation parameter for the seed meter 100 that is indicative of the amount of seeds remaining within the seed pool 125 based on data received from one or more fill status sensors. Specifically, in one embodiment, one or more seed pool seed sensors 102 may be used to monitor the number of filled seed cells or empty seed cells passing by the sensor(s) 102 and/or to monitor a fill-level of the seed chamber 124 of the seed meter 100, thereby providing an indication of the amount of seeds remaining within the seed pool 125.

Moreover, at (406), the method 400 may include monitoring the operation of the seed meter based on data received from a second sensor to identify the occurrence of a starvation event for the seed meter as the seeds are being discharged from the seed meter. For instance, as indicated above, one or more operational status sensors other than the fill status sensor(s) may be used to identify the occurrence of a starvation event as the seeds are being discharged from the seed meter 100. Specifically, in one embodiment, the controller 202 may be configured to monitor the sensor data received from the seed delivery sensor 80, the vacuum sensor 78, the airflow sensor 79, the pre-singulation sensor 104, and/or the post-singulation sensor 106 to identify the occurrence of a starvation event.

Referring still to FIG. 10, at (408), the method 400 may include determining a target value for the monitored parameter based at least in part on a starvation interval for the seed meter defined between the termination of the supply of seeds and the occurrence of the starvation event. Specifically, as indicated above, the controller 202 may be configured to determine a target starvation value for the starvation parameter by analyzing the non-calibrated starvation values identified for the various calibration cycles, with each non-calibrated starvation value being calculated based on the starvation parameter data occurring at the instance at which the operating interval for a given calibration cycle is equal to the starvation interval determined for such calibration cycle less the applicable starvation buffer.

Figure 11:
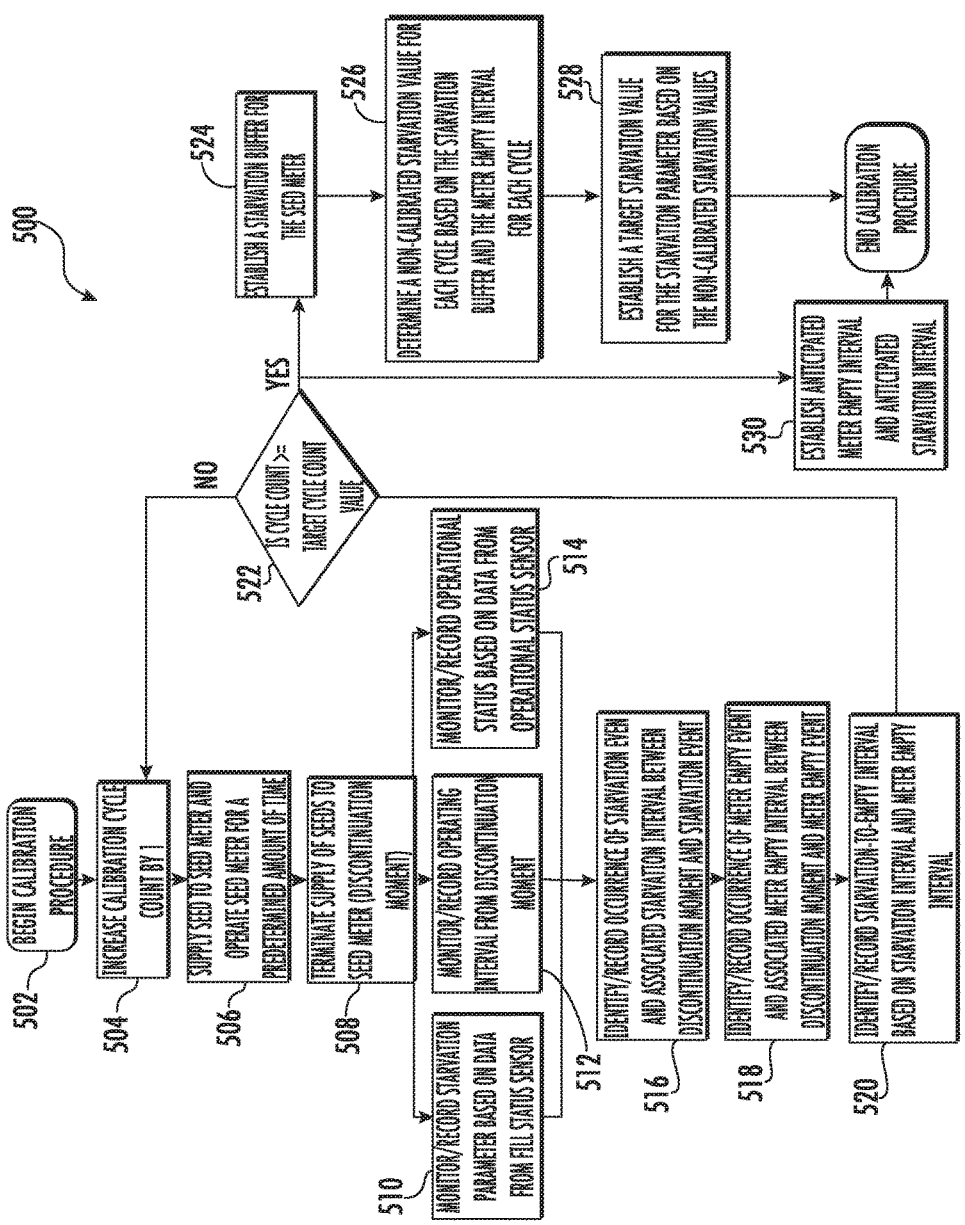
FIG. 11 illustrates a flow diagram of another embodiment of a calibration routine that may be executed when calibrating a multi-variety seed meter in accordance with aspects of the present subject matter.

Referring now to FIG. 11, a flow diagram of another embodiment of a static calibration routine 500 that may be executed when calibrating a multi-variety seed meter is illustrated in accordance with aspects of the present subject matter. In general, the calibration routine 500 will be described herein as being implemented by the controller 202 of the system 200 described above with reference to FIG. 7. However, it should be appreciated that the various processes described below may alternatively be implemented by another computing device or any combination of computing devices. In addition, although FIG. 11 depicts control steps or functions performed in a particular order for purposes of illustration and discussion, the calibration routines discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 11, upon initiation of the calibration routine 500 (e.g., at (502)), a calibration cycle count for the calibration routine 500 is increased by a value of one (e.g., at (504)). For instance, at initiation of the calibration routine 500, the calibration cycle count will be equal to zero. Thus, the calibration cycle count is initially increased to one for the first calibration cycle. Thereafter, at (506), a supply of seeds is initiated to the seed meter 100 and the seed meter 100 is then allowed to operate for a predetermined amount of time. For instance, it may be desirable for the seed meter 100 to be operated for a sufficient period of time to allow the seed meter 100 to obtain or reach steady state operation. As indicated above, in one embodiment, the supply of seeds to the seed meter 100 may be initiated, for example, by controlling the operation of the seed supply device(s) 90 provided in operative association with the seed meter 100.

Additionally, after operating the seed meter 100 for the predetermined time period, the calibration routine 500 may, at (508), include terminating the supply of seeds to the seed meter 100. For purposes of description, the moment at which the seed supply to the seed meter 100 is terminated will be referred to as the "discontinuation moment." As indicated above, in one embodiment, the supply of seeds to the seed meter 100 may be terminated, for example, by controlling the operation of the seed supply device(s) 90 provided in operative association with the seed meter 100. Upon termination of the supply of seeds to the seed meter 100, the seed meter 100 may continue to be operated to allow seeds to be discharged therefrom.

Moreover, upon termination of the supply of seeds to the seed meter 100 and as the seed meter 100 continues to be operated, the controller 202 may be configured to begin monitoring and recording (or continue to monitor and record) one or more operating parameters associated with the seed meter 100 based on various types of sensor data received by the controller 202. For instance, as shown in FIG. 11, at (510), the controller 202 may be configured to monitor and record starvation parameter data derived from the data received from one or more fill status sensors configured to provide an indication of the amount of seeds remaining within the seed pool 125 of the seed meter 100. Similar to the calibration routine 300 described above with reference to FIG. 8, the fill status sensor(s) will be described herein as corresponding to one or more seed pool sensors 102. However, in other embodiments, the fill-status sensor(s) may correspond to any other suitable sensor configured to provide an indication of the amount of seeds remaining within the seed pool 125.

Additionally, as shown in FIG. 11, at (512), simultaneous with monitoring and recording the starvation parameter data based on the data received from the fill status sensor(s), the controller 202 may also be configured to monitor and record the current operating interval for the seed meter 100 from the instance at which the seed supply was terminated (i.e., the discontinuation moment). Similar to the calibration routine 300 described above with reference to FIG. 8, the operating interval may be monitored based on sensor feedback received from one or more sensors. For instance, in one embodiment, the operating interval may be measured based on a number of pulses or sensor signals received from the rotary encoder 172. In another embodiment, the operating interval may be measured based upon the number of total seed cells and/or the number of filled seed cells passing a given location within the seed meter 100, such as the number of total seed cells and/or filled seed cells detected by the pre-singulation sensor 104 and/or the post-singulation sensor 106. In a further embodiment, the operating interval monitored by the controller 202 may correspond to or be based upon the number of seeds discharged from the seed meter 100 as detected via the seed delivery sensor 80.

Moreover, at (514), simultaneous with monitoring/recording the starvation parameter data and monitoring/recording the current operating interval for the seed meter 100, the controller 202 may be configured to monitor and record additional operational status data for the seed meter 100 deriving from data received from one or more operational status sensors communicatively coupled to the controller 202. Similar to the calibration routine 300 described above with reference to FIG. 8, the operational status sensor(s) may generally correspond to any suitable sensor(s) other than the fill-status sensor(s). For example, when the fill-status sensor(s) corresponds to the seed pool sensor 102, the operational status sensor(s) may correspond to any other suitable sensor configured to monitor the operation of the seed meter 100, such as the pre-singulation sensor 104, the post-singulation sensor 106, the seed delivery sensor 80, and/or the vacuum sensor 78.

Referring still to FIG. 11, at (516), the controller 202 may be configured to identify and record the occurrence of a starvation event for the seed meter 100 as well as identify and recorded the associated starvation interval defined between the discontinuation moment and the detected starvation event. In general, the occurrence of the starvation event may, for example, be detected in same the manner as that described above with reference to element 316 of the calibration routine 300 shown in FIG. 8. For instance, in one embodiment, the starvation event can be identified by detecting when the number of seed skips across a given number of anticipated seeds passing through the seed tube 72 (or other seed delivery mechanism) exceeds a first predetermined seed skip threshold. In another embodiment, the starvation event can be identified by detecting when the vacuum pressure applied to the seed transport member 116 drops from a relatively steady operating pressure to a relatively steady, lower operating pressure. In a further embodiment, the starvation event can be identified by detecting when the number of open or empty seed cells within a given number of total seed cells passing a specific location within the seed meter 100 (e.g., passing the location of the pre-singulation sensor 104 and/or the post-singulation sensor 106) exceeds a first predetermined empty cell threshold.

Similarly, the starvation interval for the seed meter 100 may, for example, be identified in same the manner as that described above with reference to element 318 of the calibration routine 300 shown in FIG. 8. Specifically, upon detecting the occurrence of the starvation event, the controller 202 may be configured to identify the starvation interval for the seed meter 100 as corresponding to the monitored operating interval between the discontinuation moment and the detected starvation event.

Moreover, at (518), following the detection of the starvation event, the controller 202 may be configured to continue monitoring the operation of the seed meter so as to identify and record the occurrence of a meter empty event for the seed meter 100. As used herein, a "meter empty event" generally refers to the instance during operation of the seed meter 100 at which the seeds contained within the seed pool 125 have been effectively evacuated therefrom (e.g., to within an acceptable tolerance range) such that the seed meter 100 is no longer actively discharging seeds at a rate above a given threshold. In this regard, it is noted that, while seeds may still remain within the seed pool 125 upon the detection of the meter empty event, the number of seeds remaining at the occurrence of the meter empty event will be substantially less than the seed count at the occurrence of the previously detected starvation event. For instance, in one embodiment, the number of seeds remaining within the seed pool 125 at the occurrence of the meter empty event will be less than 50% of the number of seeds remaining within the seed pool 125 at the previous occurrence of the starvation event, such as less than 25% of the number of seeds remaining at occurrence of the starvation event or less than 10% of the number of seed remaining at the occurrence of the starvation event.

In general, similar to the starvation event, the meter empty event may be identified by detecting a given change in one or more operating parameters or states associated with the seed meter 100 that provide an indication that the seed pool 125 is about to be emptied of seeds. For instance, as indicated above, the starvation event can be identified by detecting via the seed delivery sensor 80 when the number of seed skips across a given number of anticipated seeds passing through the seed tube 72 (e.g., 20 seeds) exceeds a first predetermined seed skip threshold (e.g., 3 seeds). In such an embodiment, the meter empty event may, for example, be identified by detecting via the seed delivery sensor 80 when the number of seed skips across a given number of anticipated seeds passing through the seed tube 72 exceeds a second predetermined seed skip threshold that is higher than the first predetermined seed skip threshold. Thus, following detection of the starvation event, the controller 202 may continue to monitor the sensor data from the seed delivery sensor 80 to identify the occurrence of the meter empty event using the higher, second predetermined seed skip threshold. For instance, upon detecting that the number of seed skips across a given number of anticipated seeds (e.g., 10 seeds) exceeds the second predetermined seed skip threshold (e.g., 8 seed skips), the controller 202 may be configured to identify the instance of the first seed skip within the group of detected seed skips as the moment of the occurrence of the meter empty event.

In another embodiment, the vacuum sensor 78 may be used as a means to identify the occurrence of the meter empty event. For example, as indicated above, the starvation event can be identified by detecting when the vacuum pressure applied to the seed transport member 116 drops from a relatively steady operating pressure to a relatively steady, lower operating pressure. In such an embodiment, the meter empty event may, for example, be identified by detecting with the vacuum pressure drops below a minimum pressure threshold that is less than the above-referenced lower operating pressure. Thus, following detection of the starvation event, the controller 202 may continue to monitor the sensor data from the vacuum sensor 78 to identify the occurrence of the meter empty event using the minimum pressure threshold. For instance, upon detecting that the vacuum pressure has dropped below the minimum pressure threshold, the controller 202 may be configured to identify the instance at which the operating pressure initially dropped below such threshold as the moment of the occurrence of the meter empty event.

In yet another embodiment, the airflow sensor 79 may be used as a means to identify the occurrence of the meter empty event. For example, as indicated above, the starvation event can be identified by detecting when the airflow level applied to the seed transport member 116 increases from a relatively steady operating airflow to a relatively steady, higher operating airflow. In such an embodiment, the meter empty event may, for example, be identified by detecting when the airflow level increases above a predetermined airflow threshold that is greater than the above-referenced high operating airflow. Thus, following detection of the starvation event, the controller 202 may continue to monitor the sensor data from the airflow sensor 79 to identify the occurrence of the meter empty event using the predetermined airflow threshold. For instance, upon detecting that the airflow level has increased above the predetermined airflow threshold, the controller 202 may be configured to identify the instance at which the operating airflow initially increased above such threshold as the moment of the occurrence of the meter empty event.

In a further embodiment, the pre-singulation sensor 104 and/or the post-singulation sensor 106 may be used as a means to identify the occurrence of the meter empty event. For instance, as indicated above, the starvation event can be identified by detecting when the number of open or empty seed cells within a given number of total seed cells passing the location of the pre-singulation sensor 104 and/or the post-singulation sensor 106 (e.g., 20 seed cells) exceeds a first predetermined empty cell threshold (e.g., 3 seed cells). In such an embodiment, the meter empty event may, for example, be identified by detecting when the number of open or empty seed cells within a given number of total seed cells passing the location of the pre-singulation sensor 104 and/or the post-singulation sensor 106 exceeds a second predetermined empty cell threshold that is higher than the first predetermined empty cell threshold. Thus, following detection of the starvation event, the controller 202 may continue to monitor the sensor data from the pre-singulation sensor 104 and/or the post-singulation sensor 106 to identify the occurrence of the meter empty event using the higher, second predetermined empty cell threshold. For instance, upon detecting that the number of empty seed cells across a given total number of seed cells passing the sensor location(s) (e.g., 10 seed cells) exceeds a second predetermined empty cell threshold (e.g., 8 cells), the controller 202 may be configured to identify the instance of the first empty seed cell within the group of detected empty seed cells as the moment of the occurrence of the meter empty event.

Additionally, at (518), the controller 202 may also be configured to identify and record a meter empty operating interval for the seed meter 100 defined between the instance at which the seed supply was initially terminated (i.e., the discontinuation moment) and the occurrence of the meter empty event. As indicated above, the controller 202 may be configured to continuously monitor the current operating interval for the seed meter 100 following the discontinuation moment. Thus, upon detecting the occurrence of the meter empty event, the controller 202 may be configured to identify the meter empty operating interval for the seed meter 100 as corresponding to the operating interval between the discontinuation moment and the meter empty event. For instance, in one embodiment, the meter empty operating interval may correspond to or be based upon the extent to which the seed transport member 116 has been rotated between the discontinuation moment and the occurrence of the meter empty event. In another embodiment, the meter empty operating interval may correspond to or be based upon the number of total seed cells and/or the number of filled seed cells passing a given location within the seed meter 100 between the discontinuation moment and the occurrence of the meter empty event.

Moreover, as shown in FIG. 11, at (520), the controller 202 may be configured to calculate an intermediate operating interval defined between the occurrence of the starvation event and the occurrence of the meter empty event (also referred to herein as the "starvation-to-empty interval") and store data associated with such operating interval within its memory 206. For instance, in one embodiment, the controller 202 may determine the starvation-to-empty interval by calculating a differential between the starvation interval and the meter empty interval.

Further, as shown in FIG. 11, at (522), the controller 202 may be configured to determine whether the calibration cycle count for the calibration routine 500 is greater than or equal to a predetermined cycle count value. For instance, it may be desirable to execute the above-referenced calibration cycle (e.g., boxes 506-520) a given number times (e.g., 5 or more times) to acquire a sufficient amount of calibration data for the seed meter 100. In the event that the calibration cycle count for the calibration routine 500 is not greater than or equal to the predetermined cycle count value, the calibration routine 500 may return to 504 to allow for the execution of another calibration cycle.

However, as shown in FIG. 11, if the calibration cycle count for the calibration routine 500 is greater than or equal to the predetermined cycle count value, the controller may, at (524), be configured to establish a starvation buffer for the seed meter 100. In general, the starvation buffer may, for example, be established in the same manner as that described above with reference to element 322 of the calibration routine 300 shown in FIG. 8. For instance, in one embodiment, the starvation buffer may correspond to a predetermined or fixed buffer value, such as a manufacturer-selected buffer value or an operator-selected buffer value. In another embodiment, the starvation buffer may be calculated as a function of the sensing delay interval between the fill status sensor(s) and the operational status sensor(s), such as by setting the starvation buffer to be equal to the sensing delay interval or by setting the starvation buffer to be equal to the summation of the sensing delay interval and an additional safety margin value.

In addition to calculating the starvation buffer as a function of the sensing delay interval (or as an alternative thereto), the starvation buffer may be calculated based on the aggregated interval data from the various calibration cycles. Specifically, in several embodiments, the starvation buffer may be calculated based on the aggregated interval data associated with each intermediate or starvation-to empty interval identified from the various calibration cycles between the occurrence of each starvation event and the occurrence of each associated meter empty event. For instance, in one embodiment, the identified starvation-to empty intervals from the various calibration cycles may be compared to one another to allow the maximum starvation-to empty interval to be determined, which may then be used to determine the starvation buffer. In another embodiment, the identified starvation-to empty intervals from the various calibration cycles may be averaged to calculate the starvation buffer. Alternatively, both the average and standard deviation of the identified starvation-to empty intervals from the various calibration cycles may be used to calculate the starvation buffer. Such a methodology allows the calculation to take into account the amount of variability in the data. For instance, in one embodiment, the starvation buffer may be calculated according to the following equation (Equation 2):

$$SB = AVG + 3*STDDEV \quad (2)$$

wherein, SB corresponds to the starvation buffer, AVG corresponds to the average of the identified intermediate operating intervals from the various calibration cycles, and STDDEV corresponds to the standard deviation of the identified intermediate operating intervals from the various calibration cycles.

It should be appreciated that, when the starvation buffer is determined as a function of the aggregated starvation-to empty interval data, the starvation buffer may, in one embodiment, be set based solely on such data, such as by setting the starvation buffer value to be equal to the aggregated starvation-to empty interval value (e.g., the average value or the value as determined in accordance with Equation 2 above). Alternatively, the starvation buffer may be determined based on both the aggregated starvation-to empty interval data and the sensing delay interval. For instance, in one embodiment, the aggregated starvation-to empty interval value and the sensing delay interval for the seed meter 100 may be summed together to calculate the starvation buffer. In another embodiment, the aggregated starvation-to empty interval value may be combined with an additional safety factor or margin for the seed meter 100 to determine the starvation buffer.

Referring still to FIG. 11, at (526), the controller 202 may be configured to assess the starvation parameter data stored for the various calibration cycles to determine a non-calibrated starvation value for each cycle based on the meter empty interval associated with such calibration cycle and the starvation buffer. Specifically, for each calibration cycle, the controller 202 may be configured to retrieve the value for the monitored starvation parameter at the instance at which the operating interval for the seed meter 100 was equal to the meter empty interval for such calibration cycle less the starvation buffer. The specific value for the monitored starvation parameter at such instance may then be identified as the non-calibrated starvation value for the associated calibration cycle.

Additionally, at (528), the controller 202 may be configured to establish a target starvation value for the starvation parameter based on the non-calibrated starvation values for the various calibration cycles that corresponds to the monitored value that is expected to be derived from the fill status sensor date received at, or shortly prior to, the occurrence of a starvation event for the seed meter 100. As a result, upon subsequent operation of the seed meter 100, the target starvation value for the starvation parameter may serve as an accurate and reliable indicator of the occurrence or imminent occurrence of a starvation event. In one embodiment, the target starvation value may be calculated in the same manner as that described above with reference to element 326 of the calibration routine 300 shown in FIG. 8, such as by averaging the non-calibrated starvation values recorded for the various calibration cycles, by using the average and standard deviation of the various non-calibrated starvation values (e.g., as shown in Equation 1), or by using any other suitable statistical method(s).

Additionally, in several embodiments, the controller 202 may, at (530), also be configured to aggregate all of the operating interval data to determine both an anticipated meter empty interval for the seed meter 100 and an anticipated starvation interval for the seed meter 100. In general, the anticipated meter empty interval may be calculated in any suitable manner. For instance, in one embodiment, the identified meter empty operating intervals from the various calibration cycles may be compared to one another to allow shortest meter empty operating interval to be determined, which may then be set as the anticipated meter empty interval. In another embodiment, the identified meter empty operating intervals from the various calibration cycles may be averaged to calculate the anticipated meter empty interval. Alternatively, both the average and standard deviation of the identified meter empty operating intervals from the various calibration cycles may be used to calculate the anticipated meter empty interval. Such a methodology allows the calculation to take into account the amount of variability in the data. For instance, in one embodiment, the anticipated meter empty interval may be calculated according to the following equation (Equation 3):

$$AMEI = AVG - 3*STDDEV \quad (3)$$

wherein, AMEI corresponds to the anticipated meter empty interval, AVG corresponds to the average of the identified meter empty operating intervals from the various calibration cycles, and STDDEV corresponds to the standard deviation of the identified meter empty operating intervals from the various calibration cycles.

Similarly, it should be appreciated that the anticipated starvation interval may be calculated in any suitable manner. For instance, in one embodiment, the starvation operating intervals recorded for the various calibration cycles may be averaged to determine the final, anticipated starvation interval for the seed meter 100. In another embodiment, the anticipated starvation interval may be calculated as a function of both the anticipated meter empty interval and the starvation buffer. For instance, in a particular embodiment, the anticipated starvation interval may be calculated according to the following equation (Equation 4):

$$ASI = AMEI - SB \quad (4)$$

wherein ASI corresponds to the anticipated starvation interval, AMEI corresponds to the anticipated meter empty interval, and SB corresponds to the starvation buffer.

Figure 12:
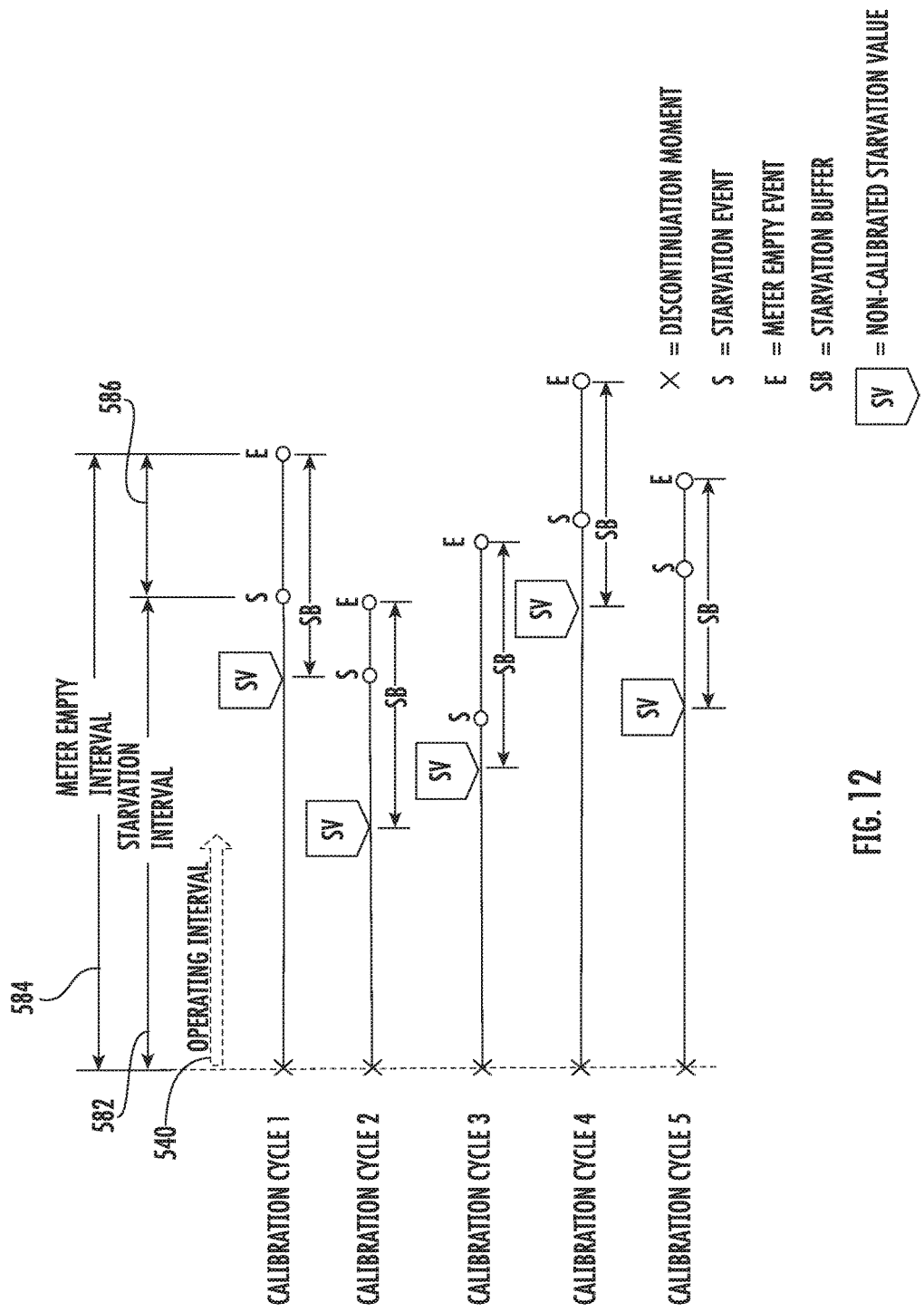
FIG. 12 illustrates another graphical view of example calibration data that may be obtained when performing a calibration routine in accordance with aspects of the present subject matter.

Referring now to FIG. 12, a graphical example of calibration data that may be obtained from a plurality of calibration cycles performed using the calibration routine 500 described above with reference to FIG. 11 is illustrated in accordance with aspects of the present subject matter. Specifically, FIG. 12 illustrates example data from five separate calibration cycles. As shown, during each calibration cycle, the supply of seeds to the seed meter was terminated at the discontinuation moment (identified by "X" in FIG. 12) and the subsequent operating interval was monitored (indicated by arrow 580) (e.g., using encoder data, cell count data, filled cell count data, and/or the like) as the operation of the seed meter 100 was continued to allow the discharge of seeds therefrom. Although not shown, sensor data from the associated fill status sensor(s) was also recorded during each calibration cycle. Additionally, as shown in FIG. 12, a Starvation Event ("S") and a Meter Empty Event ("E") was detected during each calibration cycle (e.g., using data from the operational status sensor, such as the associated seed delivery sensor 80, vacuum sensor 78, the airflow sensor 79, pre-singulation sensor 104, post-singulation sensor 106, and/or the like). By detecting such events, a corresponding starvation interval 582, a meter empty interval 584, and starvation-to-empty interval may also be identified for each calibration cycle between the discontinuation moment and the respective occurrences of the detected events.

As indicated above, following the execution of the various calibration cycles, the associated data can be analyzed to determine a non-calibrated starvation value ("SV") for each calibration cycle. For instance, as shown in FIG. 12, to determine the instance across the operating interval for each calibration cycle at which the starvation parameter value should be retrieved, the starvation buffer ("SB") can be subtracted from the meter empty interval identified for such calibration cycle. The starvation parameter value at such instance within each calibration cycle (identified in FIG. 12 by the enclosed "SV") may then be identified as the non-calibrated starvation value for such cycle. Thus, as shown in FIG. 12, by backtracking within the data from the meter empty event identified for each calibration cycle by an amount equal to the starvation buffer, non-calibrated starvation values may be identified for the various calibration cycles.

Figure 13:
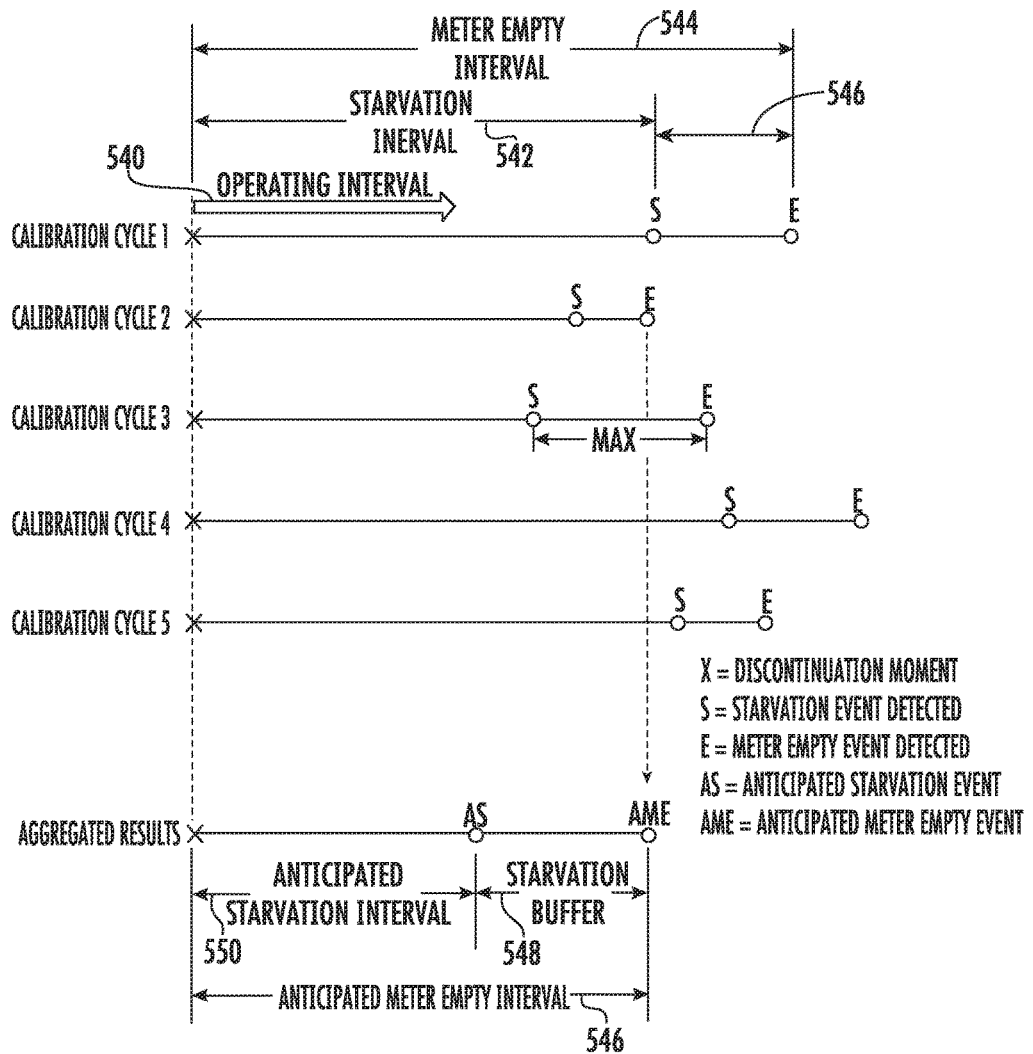
FIG. 13 illustrates a further graphical view of example calibration data that may be obtained when performing a calibration routine in accordance with aspects of the present subject matter.

Referring now to FIG. 13, another graphical example of calibration data that may be obtained from a plurality of calibration cycles performed using the calibration routine 500 described above with reference to FIG. 11 is illustrated in accordance with aspects of the present subject matter. Specifically, FIG. 13 illustrates example data from five separate calibration cycles. As shown, during each calibration cycle, the supply of seeds to the seed meter was terminated at the discontinuation moment (identified by "X" in FIG. 13) and the subsequent operating interval was monitored (indicated by arrow 540) (e.g., using encoder data, cell count data, filled cell count data, and/or the like) as the operation of the seed meter 100 was continued to allow the discharge of seeds therefrom. Although not shown, sensor data from the associated fill status sensor(s) was also recorded during each calibration cycle. Additionally, as shown in FIG. 13, both a Starvation Event ("5") and Meter Empty Event ("E") was detected during each calibration cycle (e.g., using data from the associated seed delivery sensor 80, airflow sensor 79, vacuum sensor 78, pre-singulation sensor 104, post-singulation sensor 106, and/or the like). By detecting such events, a corresponding starvation interval 542, meter empty interval 544, and starvation-to-empty interval 546 may also be identified for each calibration cycle between the discontinuation moment and the respective occurrences of the starvation and meter empty events.

As indicated above, following the execution of the various calibration cycles, the associated data can be aggregated to allow one or more calibration values or parameters to be determined. For instance, in one embodiment, an anticipated meter empty event ("AME") and an associated anticipated meter empty interval 546 may be determined based on the aggregated data associated with the identified meter empty operating intervals from the various calibration cycles. Specifically, as shown in FIG. 13, in one embodiment, the anticipated meter empty event may be identified as corresponding to the starvation event detected during the calibration routine that has the shortest meter empty operating interval (e.g., from calibration cycle 2). However, as indicated above, in other embodiments, the anticipated meter empty event and the associated anticipated meter empty interval may be calculated in any other suitable manner, such as by averaging the identified meter empty operating intervals from the various calibration cycles or by using the average meter empty interval in combination with the standard deviation.

Additionally, as shown in FIG. 13, in several embodiments, a starvation buffer 548 may be calculated based on the differential between the starvation operating intervals and the meter empty operating intervals for each calibration cycle (i.e., each "starvation-to-empty interval"). Specifically, as shown in FIG. 13, in one embodiment, the starvation buffer 548 may be identified as corresponding to the maximum starvation-to-empty interval detected during the calibration routines between each pair of starvation and meter empty events (e.g., from calibration cycle 3). However, as indicated above, in other embodiments, the starvation buffer 548 may be calculated in any other suitable manner, such as by statistically aggregating the starvation-to-empty intervals from the various calibration cycles and applying an additional safety margin or buffer, by summing the aggregated starvation-to-empty interval data with the sensing delay interval for the seed meter 100 between its fill status sensor(s) and its operational status sensor(s), by summing the sensing delay interval for the seed meter 100 with an additional safety margin or buffer, or by using any other suitable methodology.

Moreover, as shown in FIG. 13, an anticipated starvation event ("AS") and an associated anticipated starvation interval 550 may be determined based on the anticipated meter empty interval and the starvation buffer. For instance, as described above, the anticipated starvation interval may be determined by subtracting the starvation buffer from the anticipated meter empty interval.

Figure 14:
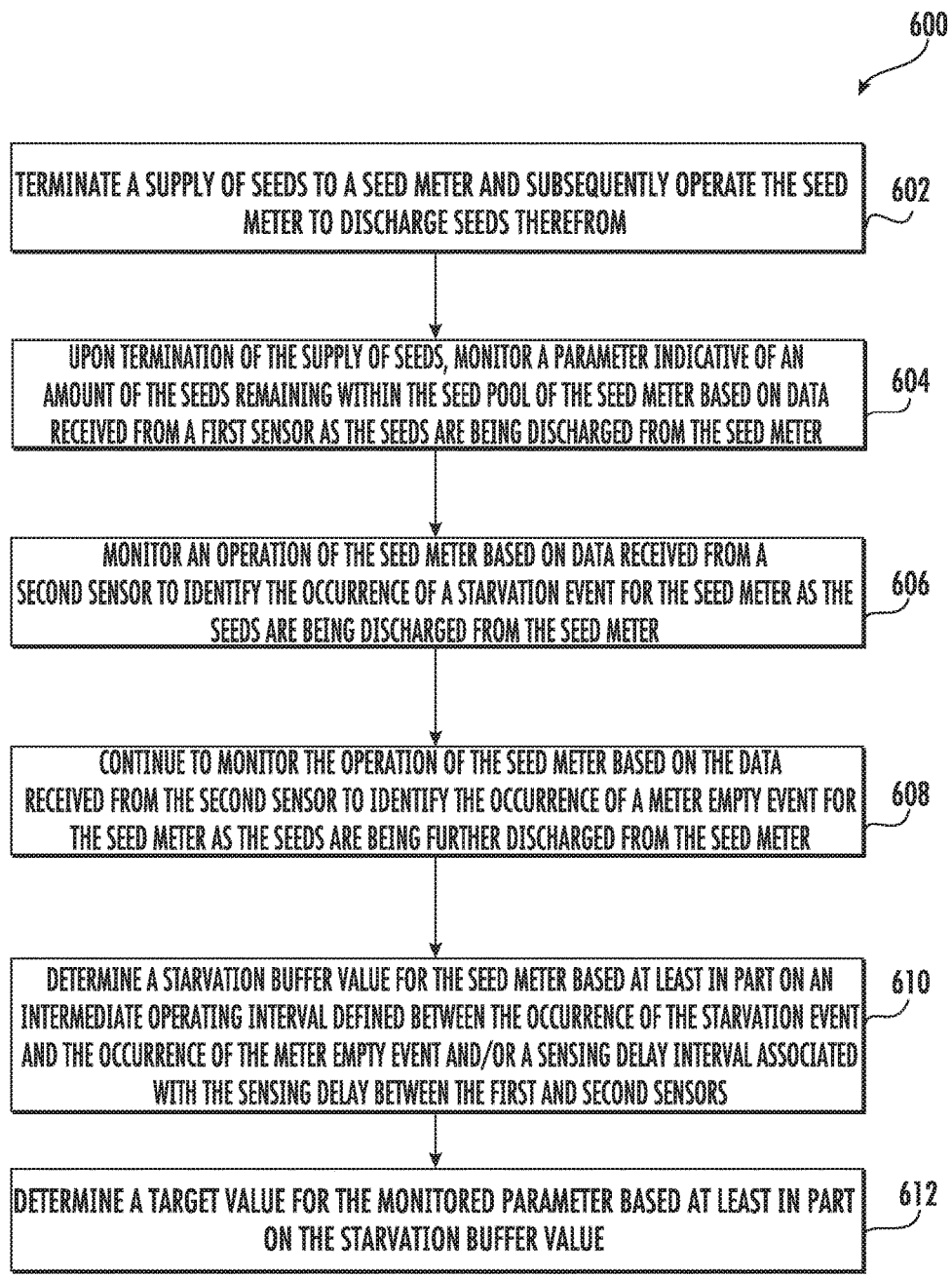
FIG. 14 illustrates a flow diagram of another embodiment of a calibration method for a multi-variety seed meter in accordance with aspects of the present subject matter.

Referring now to FIG. 14, a flow diagram of another embodiment of a calibration method 600 for a multi-variety seed meter is illustrated in accordance with aspects of the present subject matter. In general, the method 600 will be described herein with reference to the system 200 described above with reference to FIG. 7 and the calibration routine 500 described above with reference to FIG. 11. However, it should be appreciated by those of ordinary skill in the art that the disclosed method 600 may be implemented within any other system and/or using any other suitable calibration routine. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (602), the method 600 may include terminating the supply of seeds to a seed meter and subsequently operating the seed meter to discharge seeds therefrom. For instance, as indicated above, in one embodiment, the system controller 202 may be configured to control the operation of an associated seed supply device(s) 90 to terminate or shut-off the supply of seeds to the seed meter 100.

Additionally, at (604), the method 600 may include monitoring a parameter indicative of an amount of the seeds remaining within the seed pool of the seed meter based on data received from a first sensor as the seeds are being discharged from the seed meter upon termination of the seed supply thereto. For example, as indicated above, the controller 202 may be configured to monitor a starvation parameter indicative of the amount of seeds remaining within the seed pool 125 based on data received from one or more fill status sensors. Specifically, in one embodiment, one or more seed pool seed sensors 102 may be used to monitor the number of filled seed cells or empty seed cells passing by the sensor(s) 102 and/or to monitor a fill-level of the seed chamber 124 of the seed meter 100, thereby providing an indication of the amount of seeds remaining within the seed pool 125.

Moreover, at (606), the method 600 may include monitoring the operation of the seed meter based on data received from a second sensor to identify the occurrence of a starvation event for the seed meter as the seeds are being discharged from the seed meter. For instance, as indicated above, one or more operational status sensors other than the fill status sensor(s) may be used to identify the occurrence of a starvation event as the seeds are being discharged from the seed meter 100. Specifically, in one embodiment, the controller 202 may be configured to monitor the sensor data received from the seed delivery sensor 80, the vacuum sensor 78, the airflow sensor 79, the pre-singulation sensor 104, and/or the post-singulation sensor 106 to identify the occurrence of a starvation event.

Referring still to FIG. 14, at (608), the method 600 may also include continuing to monitor the operation of the seed meter based on the sensor data received from the second sensor to identify the occurrence of a meter empty event for the seed meter as further seeds are being discharged from the seed meter. For instance, as indicated above, the data received from one or more of the operational status sensors may also be used to identify the occurrence of a meter empty event following the detection of the starvation event.

Additionally, at (610), the method 600 may include determining a starvation buffer value for the seed meter based at least in part on an intermediate operating interval defined between the occurrence of the starvation event and the occurrence of the meter empty event and/or a sensing delay interval associated with the sensing delay between the first and second intervals. For instance, as indicated above, the controller 202 may, in one embodiment, be configured to determine the starvation buffer based on the intermediate or starvation-to-empty interval data, either alone or in combination with either the sensing delay interval defined between the fill status sensor(s) and the operational status sensor(s) or an additional safety margin value. Similarly, in another embodiment, the controller 202 may be configured to determine the starvation buffer based on the sensing delay interval defined between the fill status sensor(s) and the operational status sensor(s), either alone or in combination with either the starvation-to-empty interval data or an additional safety margin value.

Moreover, at (612), the method 600 may include determining a target value for the monitored parameter based at least in part on the starvation buffer value. For instance, as indicated above, the controller 202 may be configured to determine the target starvation value based on the non-calibrated starvation values identified for the various calibration cycles, with each non-calibrated starvation value being identified by evaluating the starvation parameter data at the moment at which the operating interval(s) for each calibration cycle is equal to the meter empty interval for such calibration cycle less the starvation buffer value.

Figure 15:
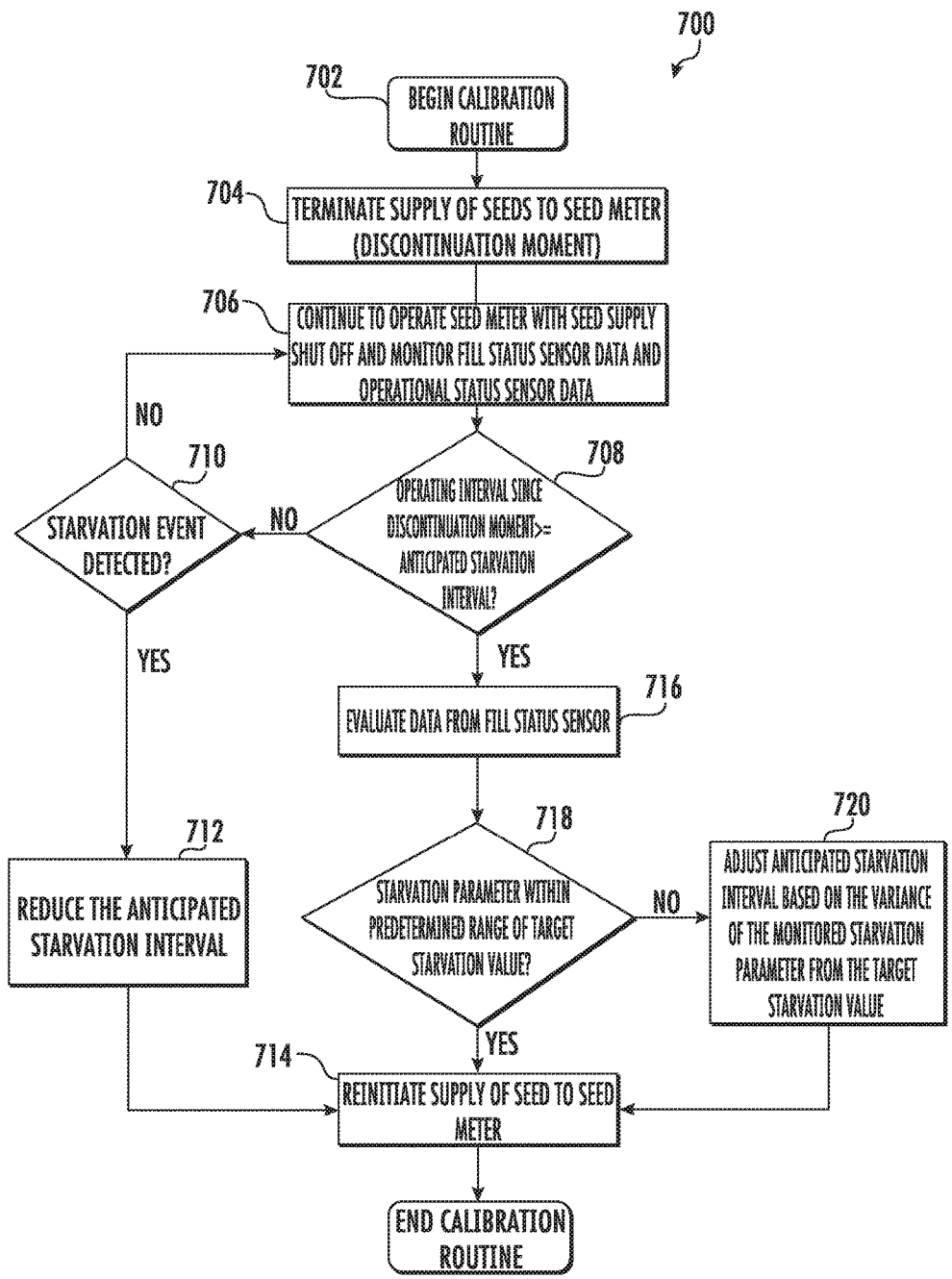
FIG. 15 illustrates a flow diagram of a further embodiment of a calibration routine that may be executed when calibrating a multi-variety seed meter in accordance with aspects of the present subject matter.

Referring now to FIG. 15, a flow diagram of one embodiment of an in-field calibration routine 700 that may be executed when performing a planting operation to calibrate a multi-variety seed meter is illustrated in accordance with aspects of the present subject matter. In general, the calibration routine 700 will be described herein as being implemented by the controller 202 of the system 200 described above with reference to FIG. 7. However, it should be appreciated that the various processes described below may alternatively be implemented by another computing device or any combination of computing devices. In addition, although FIG. 15 depicts control steps or functions performed in a particular order for purposes of illustration and discussion, the calibration routines discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As indicated above, in several embodiments, the controller 202 may, in certain instances, be configured to execute an in-field calibration routine, such as during the performance of a planting operation, to adjust one or more previously calibrated parameters for the seed meter 100. For instance, the calibration routine 700 may be performed assuming that a previous calibration routine has been performed (e.g., the routine 500 shown in FIG. 11). As a result, previous calibration data (e.g., an anticipated starvation interval and a target starvation value for the starvation parameter) may be stored within the controller's memory 206 prior to initiation of the calibration routine 700 shown in FIG. 15.

As shown in FIG. 15, upon initiation of the calibration routine 700 (e.g., at (702)), the supply of seeds to the seed meter 100 may be terminated (e.g., at (704)) (i.e., at the "discontinuation moment"). As indicated above, in one embodiment, the supply of seeds to the seed meter 100 may be terminated, for example, by controlling the operation of the seed supply device(s) 90 provided in operative association with the seed meter 100. Upon termination of the supply of seeds to the seed meter 100, the seed meter 100 may, at (706), continue to be operated to allow seeds to be discharged therefrom. In doing so, the controller 202 may be configured to monitor the sensor data being received from any associated sensors, such as the fill status sensor(s) (e.g., the seed pool sensor 102) and one or more additional operational status sensors (e.g., the seed delivery sensor 80, the airflow sensor 79, the vacuum sensor 78, the pre-singulation sensor 104, and/or the post-singulation sensor 106). In addition, the controller 202 may also be configured to monitor the current operating interval for the seed meter 100 following the termination of the seed supply (i.e., the interval from the discontinuation moment).

As the seed meter 100 is being operated following termination of the supply of seeds, the controller 202 may be configured to compare the current operating interval for the seed meter 100 to the previously determined anticipated starvation interval stored within the controller's memory 206. Specifically, as shown in FIG. 15, at (708), the controller 202 may be configured to determine whether the current operating interval for the seed meter 100 is greater than or equal to the anticipated starvation interval for the seed meter 100. If the current operating interval for the seed meter 100 is less than the anticipated starvation interval, the controller may, at (710), determine whether a starvation event has been detected based on the sensor data received from the secondary sensor(s). If a starvation event has not yet been detected, the calibration routine 700 may return back to 706.

However, if the monitored data received from the operational status sensor(s) indicates the occurrence of a starvation event, the controller 202 may, at (712), be configured to reduce the anticipated starvation interval stored within its memory 206. Specifically, if a starvation event is detected prior to the current operating interval for the seed meter 100 being equal to or exceeding the previously determined anticipated starvation interval, it may be desirable to reduce the anticipated starvation interval by a given amount to account for the inconsistency in the operation of the seed meter 100 relative to its previously acquired calibration data. For instance, in one embodiment, the anticipated starvation interval may be reduced by an amount equal to the difference in the operating interval between the moment at which the starvation event was detected and the previously determined anticipated starvation interval. Alternatively, the anticipated starvation interval may be reduced by a given percentage of such differential or by a fixed or predetermined incremental value. Regardless, upon reducing the anticipated starvation interval, the new starvation interval may be stored within the controller's memory 206. Thereafter, at (714), the supply of seeds to the seed meter 100 may be reinitiated (e.g., by controlling the operation of the seed supply device 90).

Referring back to element 708 in FIG. 15, if, instead, the current operating interval for the seed meter 100 is greater than or equal to the previously determined anticipated starvation interval, the controller 202 may, at (716), evaluate the data from the fill status sensor to determine whether the currently monitored starvation parameter value is within a predetermined tolerance range of the previously determined target starvation value for the starvation parameter (e.g., at (718)). For instance, an acceptable tolerance range may be defined relative to the target starvation value (e.g., within +/−10% of the target value or within +/−5% of the target value). If the currently monitored starvation parameter value is within the predetermined tolerance range defined relative to the target starvation value, the controller 202 may, at (714), reinitiate the supply of seeds to the seed meter 100 (e.g., by controlling the operation of the seed supply device 90).

However, if the currently monitored starvation parameter value is not within the predetermined tolerance range defined relative to the target starvation value, the controller 202 may, at (720), adjust the previously stored anticipated starvation interval based on the variance between the currently monitored starvation parameter value and the target starvation value. For instance, if the starvation value currently exceeds the target starvation value by an amount greater than the associated tolerance value, the controller 202 may be configured to increase the anticipated starvation interval by a given amount. However, if the starvation value currently falls below the target starvation value by an amount greater than the associated tolerance value, the controller 202 may be configured to reduce the anticipated starvation interval by a given amount. Regardless, upon adjusting the anticipated starvation interval, the new starvation interval may be stored within the controller's memory 204. Thereafter, at (714), the supply of seeds to the seed meter 100 may be reinitiated (e.g., by controlling the operation of the seed supply device 90).

Figure 16:
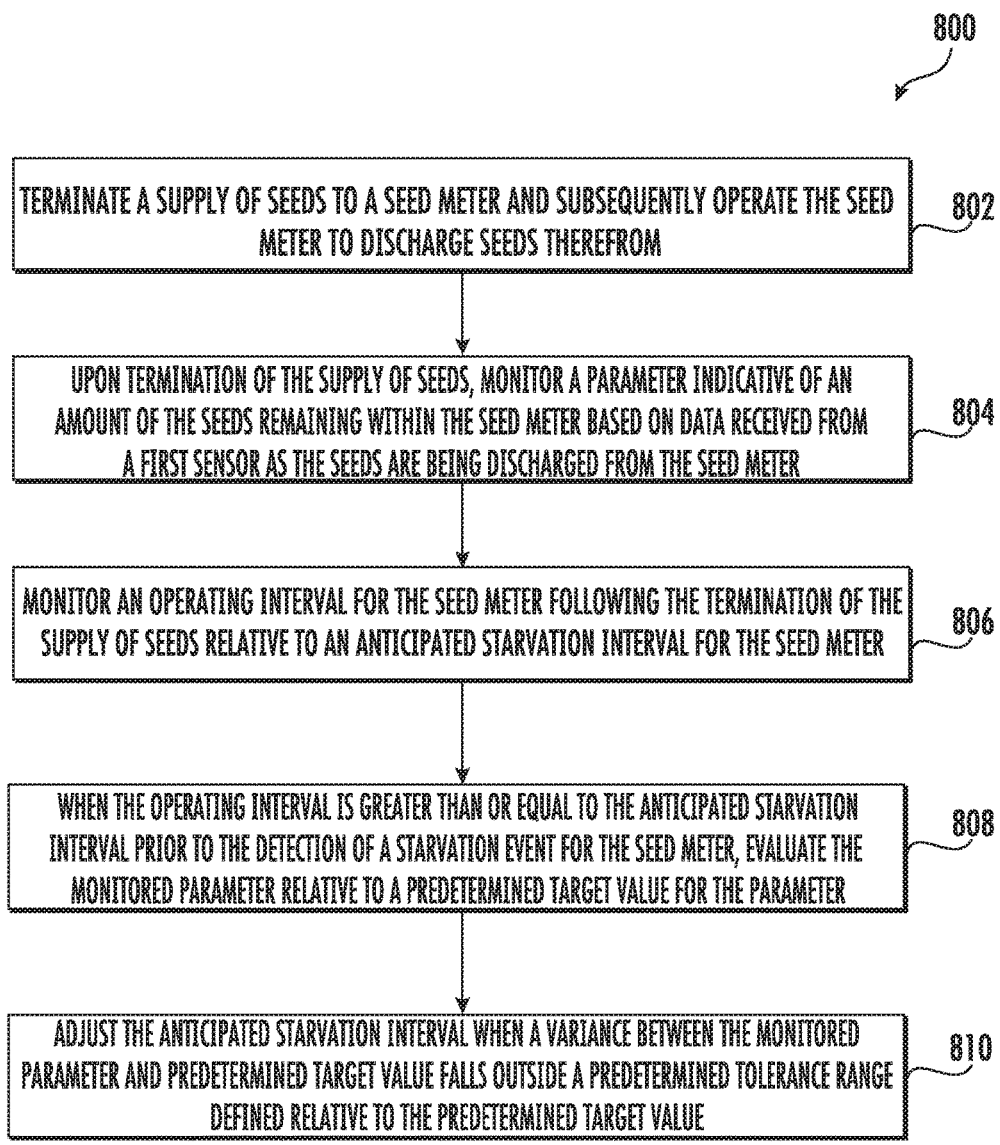
FIG. 16 illustrates a flow diagram of a further embodiment of a calibration method for a multi-variety seed meter in accordance with aspects of the present subject matter.

Referring now to FIG. 16, a flow diagram of a further embodiment of a calibration method 800 for a multi-variety seed meter is illustrated in accordance with aspects of the present subject matter. In general, the method 800 will be described herein with reference to the system 200 described above with reference to FIG. 7 and the calibration routine 700 described above with reference to FIG. 15. However, it should be appreciated by those of ordinary skill in the art that the disclosed method 800 may be implemented within any other system and/or using any other suitable calibration routine. In addition, although FIG. 16 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 16, at (802), the method 800 may include terminating the supply of seeds to a seed meter and subsequently operating the seed meter to discharge seeds therefrom. For instance, as indicated above, in one embodiment, the system controller 202 may be configured to control the operation of an associated seed supply device(s) 90 to terminate or shut-off the supply of seeds to the seed meter 100.

Additionally, at (804), the method 800 may include monitoring a parameter indicative of an amount of the seeds remaining within the seed pool of the seed meter based on data received from a first sensor as the seeds are being discharged from the seed meter upon termination of the supply of seeds thereto. For example, as indicated above, the controller 202 may be configured to monitor one a starvation parameter indicative of the amount of seeds remaining within the seed pool 125 based on data received from one or more fill status sensors. Specifically, in one embodiment, one or more seed pool seed sensors 102 may be used to monitor the number of filled seed cells or empty seed cells passing by the sensor(s) 102 and/or to monitor a fill-level of the seed chamber 124 of the seed meter 100, thereby providing an indication of the amount of seeds remaining within the seed pool 125.

Moreover, at (806), the method 900 may include monitoring an operating interval for the seed meter following the termination of the supply of seeds relative to an anticipated starvation interval for the seed meter. For example, as indicated above, when performing an in-field calibration routine, the controller 202 may be configured to monitor the current operating interval for the seed meter 100 relative to a previously determined anticipated starvation interval for the seed meter 100.

Referring still to FIG. 16, at (808), the method 800 may include evaluating the monitored parameter value relative to a predetermined target value for such parameter when the operating interval is greater than or equal to the anticipated starvation interval prior to the detection of a starvation event for the seed meter. Specifically, as indicated above, when a starvation event has not yet been detected prior to the current operating interval being equal to or exceeding the anticipated starvation interval, the controller 202 may be configured to evaluate the currently monitored starvation parameter value relative to a previously stored target value for such parameter.

Moreover, at (810), the method 800 may include adjusting the anticipated starvation interval when the variance between the monitored parameter value and the predetermined target value falls outside a predetermined tolerance range defined relative to the predetermined target value. For example, as described above, when the currently monitored starvation parameter value exceeds the predetermined target value by a given extent, the controller 202 may be configured to increase the anticipated starvation interval and store the new starvation interval within its memory 206. Similarly, when the currently monitored starvation parameter value is still below the predetermined target value by a given extent, the controller 202 may be configured to decrease the anticipated starvation interval and store the new starvation interval within its memory 206.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A calibration method for a multi-variety seed meter, the method comprising:

terminating a supply of seeds to a seed meter and subsequently operating the seed meter to discharge seeds therefrom during a first calibration cycle;

upon terminating the supply of seeds to the seed meter, monitoring, by one or more computing devices, a parameter indicative of an amount of the seeds remaining within a seed pool of the seed meter based on data received from a first sensor as the seeds are being discharged from the seed meter during the first calibration cycle, the first sensor being configured to directly detect the presence, absence or fill-level of seeds at one or more locations within the seed meter;

monitoring, by the one or more computing devices, an operation of the seed meter based on data received from a second sensor to identify the occurrence of a starvation event for the seed meter as the seeds are being discharged from the seed meter during the first calibration cycle; and determining, by the one or more computing devices, a target value for the monitored parameter based at least in part on a starvation interval for the seed meter defined between the termination of the supply of seeds to the seed meter and the occurrence of the starvation event.

2. The method of claim 1, wherein the first sensor comprises a seed pool sensor configured to directly detect the presence, absence or fill-level of seeds within a seed acquisition region of the seed meter, the seed acquisition region corresponding to at least a portion of the seed pool across which a section of a seed transport member of the seed meter is rotated therethrough.

3. The method of claim 2, wherein the monitored parameter corresponds to or is determined based at least in part on at least one of a number of filled seed cells detected by the seed pool sensor, a number of empty seed cells detected by the seed pool sensor or the fill-level of the seeds within the seed acquisition region of the seed meter as detected by the seed pool sensor.

4. The method of claim 2, wherein monitoring the operation of the seed meter based on data received from the second sensor to identify the occurrence of the starvation event comprises monitoring at least one of a number of seed skips detected in the seeds being discharged from the seed meter, a number of empty seed cells detected within the seed meter, a vacuum pressure level applied to a seed transport member of the seed meter, or an airflow level applied to the seed transport member.

5. The method of claim 4, wherein the second sensor comprises at least one of a seed delivery sensor configured to detect seeds discharged from the seed meter into an associated seed delivery mechanism, a sensor positioned within the seed meter downstream of the first sensor, a vacuum sensor, or an airflow sensor.

6. The method of claim 1, further comprising:
executing one or more additional calibration cycles for the seed meter;
identifying one or more additional starvation intervals for the seed meter during the one or more additional calibration cycles.

7. The method of claim 6, further comprising:
referencing a starvation buffer value defined for the seed meter;
determining a first non-calibrated starvation value for the first calibration cycle based on a value of the monitored parameter during the first calibration cycle at a moment at which an operating interval for the seed meter equals the starvation interval less the starvation buffer value; and
determining one or more second non-calibrated starvation values for the one or more additional calibration cycles based on a value of the monitored parameter during each respective calibration cycle of the one or more additional calibration cycles at a moment at which an operating interval for the seed meter equals a respective starvation interval of the one or more additional starvation intervals less the starvation buffer value.

8. The method of claim 7, wherein determining the target value for the monitored parameter comprises determining the target value for the monitored parameter as a function of the first non-calibrated starvation value and the one or more second non-calibrated starvation values.

9. The method of claim 7, wherein the starvation buffer value is determined based at least in part on a sensing delay interval associated with the first and second sensors.

10. The method of claim 1, further comprising:
identifying, by the one or more computing devices, a meter empty interval for the seed meter between the termination of the supply of seeds to the seed meter and the occurrence of a meter empty event for the seed meter, the meter empty event occurring after the occurrence of the starvation event; and
determining, by the one or more computing devices, a starvation buffer value for the seed meter based, at least in part, on the starvation interval and the meter empty interval.

11. The method of claim 10, further comprising:
determining a first non-calibrated starvation value for the first calibration cycle based on a value of the monitored parameter during the first calibration cycle at a moment at which an operating interval for the seed meter equals the meter empty interval less the starvation buffer value;
executing one or more additional calibration cycles for the seed meter;
identifying one or more additional meter empty intervals for the seed meter during the one or more additional calibration cycles;
determining one or more second non-calibrated starvation values for the one or more additional calibration cycles based on a value of the monitored parameter during each respective calibration cycle of the one or more additional calibration cycles at a moment at which an operating interval for the seed meter equals a respective meter empty interval of the one or more additional meter empty intervals less the starvation buffer value.

12. The method of claim 11, wherein determining the target value for the monitored parameter comprises determining the target value for the monitored parameter as a function of the first non-calibrated starvation value and the one or more second non-calibrated starvation values.

13. A calibration method for a multi-variety seed meter, the method comprising:
terminating a supply of seeds to a seed meter and subsequently operating the seed meter to discharge seeds therefrom during a first calibration cycle;
upon terminating the supply of seeds to the seed meter, monitoring, by one or more computing devices, a parameter indicative of an amount of the seeds remaining within a seed pool of the seed meter based on data received from a first sensor as seeds are being discharged from the seed meter during the first calibration cycle;
monitoring, by the one or more computing devices, an operation of the seed meter based on data received from a second sensor to identify the occurrence of a starvation event for the seed meter as the seeds are being discharged from the seed meter during the first calibration cycle;
continuing to monitor, by the one or more computing devices, the operation of the seed meter based on the data received from the second sensor to identify the occurrence of a meter empty event for the seed meter as the seeds are being further discharged from the seed meter during the first calibration cycle, the meter empty event occurring after the occurrence of the starvation event;

determining, by the one or more computing devices, a starvation buffer value for the seed meter based at least in part on at least one of an intermediate operating interval defined between the occurrence of the starvation event and the occurrence of the meter empty event or a sensing delay interval associated with the first and second sensors; and determining, by the one or more computing devices, a target value for the monitored parameter based at least in part on the starvation buffer value.

14. The method of claim 13, further comprising identifying, by the one or more computing devices, a meter empty interval for the seed meter between the termination of the supply of seeds to the seed meter and the occurrence of the meter empty event.

15. The method of claim 14, further comprising:

executing one or more additional calibration cycles for the seed meter;

identifying one or more additional meter empty intervals for the seed meter during the one or more additional calibration cycles.

16. The method of claim 15, further comprising:

determining a first non-calibrated starvation value for the first calibration cycle based on a value of the monitored parameter during the first calibration cycle at a moment at which an operating interval for the seed meter equals the meter empty interval less the starvation buffer value; and determining one or more second non-calibrated starvation values for the one or more additional calibration cycles based on a value of the monitored parameter during each respective calibration cycle of the one or more additional calibration cycles at a moment at which an operating interval for the seed meter equals a respective meter empty interval of the one or more additional meter empty intervals less the starvation buffer value.

17. The method of claim 16, wherein determining the target value for the monitored parameter comprises determining the target value for the monitored parameter as a function of the first non-calibrated starvation value and the one or more second non-calibrated starvation values.

18. The method of claim 12, wherein the first sensor comprises a seed pool sensor configured to directly detect the presence, absence or fill-level of seeds within the seed pool of the seed meter; and wherein monitoring the operation of the seed meter based on the data received from the second sensor to identify the occurrence of at least one of the starvation event or the meter empty event comprises monitoring at least one of a number of seed skips detected in the seeds being discharged from the seed meter, a number of empty seed cells detected within the seed meter, a vacuum pressure level applied to a seed transport member of the seed meter, or an airflow level applied to the seed transport member.

19. A calibration method for a multi-variety seed meter, the method comprising:

terminating a supply of seeds to a seed meter and subsequently operating the seed meter to discharge seeds therefrom;

upon terminating the supply of seeds to the seed meter, monitoring, by one or more computing devices, a parameter indicative of an amount of the seeds remaining within a seed pool of the seed meter based on data received from a first sensor as the seeds are being discharged from the seed meter;

monitoring, by the one or more computing devices, an operating interval for the seed meter following the termination of the supply of seeds relative to an anticipated starvation interval for the seed meter;

in the event that the operating interval is greater than or equal to the anticipated starvation interval prior to the detection of a starvation event for the seed meter, evaluating, by the one or more computing devices, the monitored parameter relative to a predetermined target value for the monitored parameter; and adjusting, by the one or more computing devices, the anticipated starvation interval when a variance between the monitored parameter and the predetermined target value falls outside a predetermined tolerance range defined relative to the predetermined target value.

20. The method of claim 19, further comprising, in the event that the starvation event has occurred prior to the operating interval being greater than or equal to the anticipated starvation interval, reducing the anticipated starvation interval and storing the reduced anticipated starvation interval within memory of the one or more computing devices.

* * * * *